(12) United States Patent
Ebnoether

(10) Patent No.: US 8,835,016 B2
(45) Date of Patent: Sep. 16, 2014

(54) OPTIMAL SANDWICH CORE STRUCTURES AND FORMING TOOLS FOR THE MASS PRODUCTION OF SANDWICH STRUCTURES

(71) Applicant: Fabien Ebnoether, Paris (FR)

(72) Inventor: Fabien Ebnoether, Paris (FR)

(73) Assignee: Celltech Metals, Inc., San Diego, CA (US)

( * ) Notice: Subject to any disclaimer, the term of this patent is extended or adjusted under 35 U.S.C. 154(b) by 0 days.

(21) Appl. No.: 13/859,474

(22) Filed: Apr. 9, 2013

(65) Prior Publication Data

US 2013/0330521 A1    Dec. 12, 2013

Related U.S. Application Data

(63) Continuation-in-part of application No. 13/419,613, filed on Mar. 14, 2012.

(51) Int. Cl.
*B32B 3/28* (2006.01)
*B32B 3/30* (2006.01)
*B32B 15/01* (2006.01)

(52) U.S. Cl.
CPC ... *B32B 3/28* (2013.01); *B32B 3/30* (2013.01); *B32B 15/01* (2013.01)
USPC ............................. 428/593; 428/604; 52/789.1

(58) Field of Classification Search
USPC ................... 428/604, 593; 52/789.1
See application file for complete search history.

(56) References Cited

U.S. PATENT DOCUMENTS

| | | | |
|---|---|---|---|
| 2,087,010 A | | 7/1937 | Wardle |
| 2,391,997 A | * | 1/1946 | Noble ............................ 52/578 |
| 2,441,476 A | * | 5/1948 | Ewald ............................ 428/604 |
| 2,481,046 A | * | 9/1949 | Scurlock ........................ 428/593 |
| 2,738,297 A | | 3/1956 | Pfisterhammer |
| 2,809,908 A | | 10/1957 | French |
| 2,950,788 A | | 8/1960 | Edgar |
| 3,013,641 A | * | 12/1961 | Compton ........................ 428/178 |
| 3,086,899 A | | 4/1963 | Smith |
| 3,151,712 A | | 10/1964 | Jackson |
| 3,173,383 A | | 3/1965 | Eggert |
| 3,217,845 A | * | 11/1965 | Koeller et al. .................. 428/604 |
| 3,227,598 A | | 1/1966 | Robb |
| 3,432,859 A | | 3/1969 | Jordan |

(Continued)

OTHER PUBLICATIONS

Kim, Jang-Kyo, et al.; "Forming and failure behaviour of coated, laminated and sandwiched sheet metals: a review", *Journal of Materials Processing Technology*, 63 1997, pp. 33-42.

(Continued)

*Primary Examiner* — John J Zimmerman
(74) *Attorney, Agent, or Firm* — Harness, Dickey & Pierce, P.L.C.

(57) ABSTRACT

A sandwich structure is provided that includes a corrugated layer with at least one core layer (structure) made of a periodic array of adjacent truncated upward facing peaks and truncated downward facing valleys. Each truncated peak has a bonding land of an area A1. Each truncated valley has a bonding land of an area A2. A ratio of A1/A2 is less than 2. A distance D is between neighboring peaks, and a distance D is also between neighboring valleys. The corrugated layer is made from an initially flat sheet thickness of t. A first sheet layer is physically coupled to bonding lands of the truncated peaks. A second sheet layer is physically coupled to bonding lands of the truncated valleys.

28 Claims, 19 Drawing Sheets

(56) References Cited

U.S. PATENT DOCUMENTS

| | | | |
|---|---|---|---|
| 3,481,642 A | 12/1969 | Campbell | |
| 3,525,663 A * | 8/1970 | Hale | 428/179 |
| 3,597,891 A * | 8/1971 | Martin | 52/145 |
| 3,742,663 A * | 7/1973 | Duskin | 52/145 |
| 3,834,487 A * | 9/1974 | Hale | 181/292 |
| 3,865,679 A * | 2/1975 | Hale | 428/105 |
| 3,876,492 A * | 4/1975 | Schott | 52/789.1 |
| 3,914,486 A * | 10/1975 | Borgford | 428/73 |
| 3,938,963 A * | 2/1976 | Hale | 428/582 |
| 3,950,259 A | 4/1976 | Pallo et al. | |
| 4,025,996 A | 5/1977 | Saveker | |
| 4,044,186 A * | 8/1977 | Stangeland | 428/167 |
| 4,077,247 A * | 3/1978 | Stewart | 72/325 |
| 4,275,663 A | 6/1981 | Sivachenko et al. | |
| 4,356,678 A | 11/1982 | Andrews et al. | |
| 4,411,121 A | 10/1983 | Blacklin et al. | |
| 4,718,214 A | 1/1988 | Waggoner | |
| 5,030,488 A | 7/1991 | Sobolev | |
| 5,366,787 A | 11/1994 | Yasui et al. | |
| 6,183,879 B1 * | 2/2001 | Deeley | 428/604 |
| 6,547,280 B1 | 4/2003 | Ashmead | |
| 6,846,559 B2 | 1/2005 | Czaplicki et al. | |
| 6,908,143 B2 | 6/2005 | Ashmead | |
| 6,939,599 B2 * | 9/2005 | Clark | 428/178 |
| 7,010,897 B1 | 3/2006 | Kuppers | |
| 7,025,408 B2 | 4/2006 | Jones et al. | |
| 7,267,393 B2 | 9/2007 | Booher | |
| 7,401,844 B2 | 7/2008 | Lemmons | |
| 7,648,058 B2 | 1/2010 | Straza | |
| 7,752,729 B2 | 7/2010 | Faehrrolfes et al. | |
| 7,753,254 B2 | 7/2010 | Straza | |
| 7,757,931 B2 | 7/2010 | Straza | |
| 7,927,708 B2 | 4/2011 | Mizrahi | |
| 8,205,642 B2 | 6/2012 | Straza | |
| 8,434,472 B2 | 5/2013 | Hanson et al. | |
| 8,580,061 B2 | 11/2013 | Cik | |
| 2005/0029708 A1 | 2/2005 | Coyle | |
| 2005/0084703 A1 * | 4/2005 | Ashmead | 428/593 |
| 2011/0073102 A1 * | 3/2011 | Hanson et al. | 126/601 |
| 2012/0234470 A1 | 9/2012 | Nishio et al. | |
| 2013/0224419 A1 | 8/2013 | Lee et al. | |
| 2013/0244006 A1 * | 9/2013 | Ebnoether | 428/166 |

OTHER PUBLICATIONS

Van Straalen, Ijsbrand J.; "Comprehensive Overview of Theories for Sandwich Panels", *TNO Building and Construction Research*, 1998, pp. 48-70.

Stoffer, Harry; "Some suppliers see dollars in a higher CAFE", Automotive News, Crain Communications, Inc., Jul. 2, 2007, two pages.

Carey, John; "What's Next—Green Biz Materials of New Plastics and a Steel Sandwich", BusinessWeek, Oct. 22, 2007, one page.

"... Honeycomb Structure Holds Potential", Autotech Daily, Apr. 15, 2008, one page.

Vasilash, Gary S.; "From Small Things: Big Differences", Automotive Design and Production, Jun. 2008, one page.

Photos of Hyundai "EcoCell" trailer, containing doors including CellTech LLC's three sheet steel sandwich, shown at U.S. tradeshow in Mar. 2013.

Ebnoether, Fabien, et al.; "Predicting ductile fracture of low carbon steel sheets: Stress-based versus mixed stress/strain-based Mohr-Coulomb model;" International Journal of Solids and Structures 50 (2013; published online Dec. 27, 2012); pp. 1055-1066.

"UltraSteel" brochure published by Hadley Group in Oct. 2010, 8 pages.

* cited by examiner

OPTIMAL SANDWICH CORE STRUCTURES AND FORMING TOOLS FOR THE MASS PRODUCTION OF SANDWICH STRUCTURES

CROSS-REFERENCE TO RELATED APPLICATIONS

This application is a continuation-in-part of U.S. application Ser. No. 13/419,613 filed Mar. 14, 2012, which application is fully incorporated herein by reference.

FIELD OF THE INVENTION

The presented invention relates generally to structural/multifunctional material designs and methods for their manufacturing, and more specifically to sandwich core structures that are made from initially flat sheets and bonding techniques to form cellular solids with periodic microstructures.

BACKGROUND OF THE INVENTION

Cellular solids are highly porous space filling materials with periodic or random microstructures. The effective properties of cellular solids are sensitive to the geometry of the underlying microstructures and the properties of the basis material from which these microstructures are made. In manmade cellular solids, the control of the microstructural geometry and the basis material properties is one of the key challenges in manufacturing. Foamed cellular solids typically feature a random microstructure of foam cells which is usually characterized through poor weight specific mechanical performance. For flat panel type of structures, cellular solids can be placed between two face sheets to form a sandwich panel. In particular, honeycomb sandwich panels are known for excellent bending stiffness to weight ratio. However, it appears to be impossible to manufacture metallic honeycombs in a cost-effective mass production process. Uni-directionally corrugated microstructures such as the core layer in cardboard can be produced very cost effectively. However, their weight specific mechanical performance is usually inferior to that of honeycombs. In particular, when used in metal sandwich construction, the bonding land between the core structure and the face sheets is often too small to transmit the full shear force through an adhesive bond. In other words, delamination between the core structure and the face sheets is often the critical failure mode. Furthermore, their mechanical properties are direction-dependent featuring a pronounced strong and weak direction when subject to transverse shear loading. In addition, the bonding land between a uni-directionally corrugated core structure and the face sheets is rather small and not well defined. Delamination is therefore a concern when using these materials for primary load carrying structures. It would thus be desirable to provide a technique for increasing the size of the bonding land without sacrificing weight specific mechanical performance. Uni-directionally corrugated core structures are the premier choice in applications such as packaging where costs are more important than strength and stiffness. It is apparent that it would be desirable to provide a man-made core structure which high weight specific strength and stiffness and which can be produced cost-efficiently. Anticlastic core structures as presented by Hale (1960) are equally strong in two perpendicular directions. Hale proposes various methods for making the anticlastic core structure from sheets. However, the applicability of Hale's invention seems to be limited to highly formable materials such as thermoplastics. When using conventional sheet metal, premature fracture typically limits the making of anticlastic structures (FIG. 1). It would thus be desirable to provide the geometry of forming tools which can be used to make anticlastic core structures from sheet metal. More specifically, it would be desirable to provide the geometry of forming tools which can be used for the mass production of large sandwich panels.

The procedures proposed by Hale require forces which are very large (as compared to the capacity of state-of-the-art presses) when used in conjunction with sheet metal. The procedures are thus limited to the production of small panels. It is desirable to provide a method which can be used for the production of large panels (such as needed for trucks).

SUMMARY

An object of the present invention is to provide an optimized anticlastic sandwich core structure which can be produced in cost-effective mass production process such as progressive stamping or roll embossing.

Another object of the present invention is to provide corrugated core structures and their methods of manufacture that are suitable with applications where both costs and weight-specific mechanical performance are equally important.

Yet another object is to provide an anticlastic sandwich core structure with bounds for specific dimensions of the forming tool geometry for optimal mechanical performance of the resulting core structure.

It is still a further object of the present invention to provide a uni-directionally corrugated core structure with periodically enlarged bonding lands for enhanced shear force transmission between the core structure and the face sheets when used in sandwich construction, and for enhanced shear force transmission between two contacting core layers when using multi-core layer assemblies.

It is still a further object of the present invention to provide a sandwich structure with an anticlastic core layer, wherein the anticlastic core layer includes a periodic array of adjacent truncated upward facing peaks and truncated downward facing valleys, each truncated peak having a bonding land, the anticlastic core layer fabricated from an initially flat sheet with a thickness of t using a pin structure, the pin structure including first and second sheets of pins, centers of neighboring pins in the sheets of pins being centers of neighboring pins in the sheets of pins being separated by a distance $S_L$ in L-direction and $S_W$ in W-direction, orthogonal to L-direction. The smaller of these two distances ($S_{min}=\min\{S_L, S_W\}$) being less than or equal to 200 mm and the larger of these two distances ($S_{max}=\max\{S_L, S_W\}$) being greater than or equal to 5 mm. The ratio SL/SW is larger than or equal 2 and less than or equal 0.5.

In another object of the present invention, the structure created with a pin structure has a thickness greater than or equal to 0.2 times the smaller pin distance ($S_{min}$) and less than 1 times the smaller pin distance ($S_{min}$).

In another object of the present invention, the structure is created with a pin structure that has a bonding land parameter greater than or equal to 0.05 and less than 0.4, the bonding land parameter being the ratio of a diameter of a flat area of the pins to the distance S.

It is appreciated that these and other objects can be seen on review of the drawings, the detailed description and the claims, which follow.

DETAILED DESCRIPTION OF THE PREFERRED EMBODIMENTS

In one embodiment, the present invention is a sandwich core structure which combines the advantages of honeycombs and corrugated structures. In one embodiment, a method of manufacturing is provided that allows for the cost-effective making of a lightweight core structure which can be equally stiff and strong in two orthogonal directions. The sandwich structure can be mass produced in an industrial environment and creates a new cost-effective lightweight material solution for a wide range of applications.

In one embodiment, the present invention provides constructed sandwich core structures, and sandwich structures, as well as their methods of manufacture. The structures of the present invention have a variety of different applications including but not limited to, mechanical impact/blast absorption, thermal management capacity, noise attenuation, fluid flow, load support and the like.

In one embodiment, a sandwich structure 10 is provided that applies to many sheet materials, including but not limited to, metals, polymers, composites, resin impregnated paper, and the like. That has an anticlastic core structure from sheet materials without fracturing the sheet material during manufacturing. The anticlastic core structure can be created through folding, stamping, progressively stamping, or roll embossing process. The wall thickness does not necessarily have to be uniform throughout the structure. When bonded together with face sheets or with other core layers by solid state, liquid phase, pressing or other methods at truncated peaks and valleys, a sandwich structure of high bending stiffness is obtained, whereas the bond transfers the shear forces from the face sheets into the core structure. These constructed solids offer a broad range of multifunctional structural use with a tremendous freedom for choosing the anticlastic architecture and whether the mechanical material properties are the same in two orthogonal directions of its plane. Multiple materials can be mixed. In one embodiment, the relative densities of the core structures are less than or equal 15% (i.e. the porosity is higher than or equal 85%).

Figure 3:
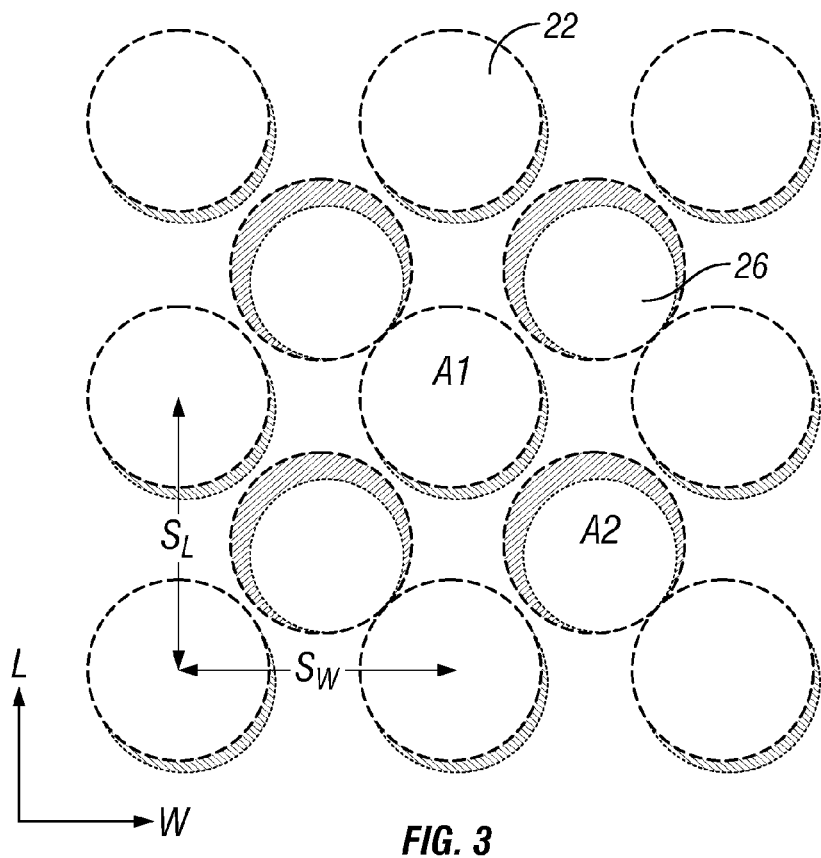
FIG. 3 illustrates a top view of one embodiment of the anticlastic structure.
Figure 4:
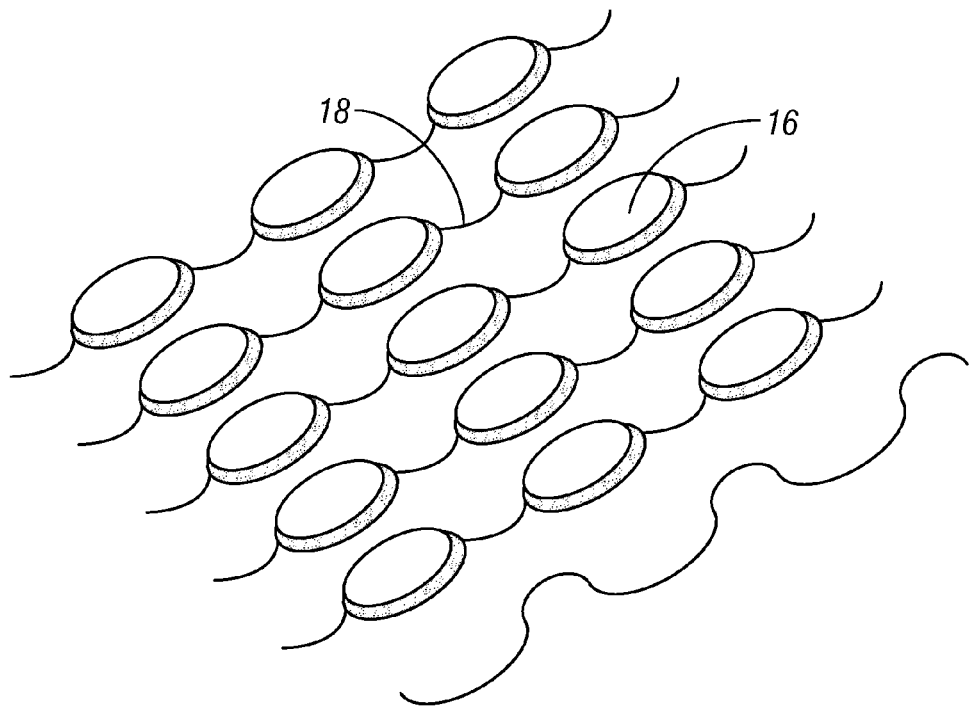
FIG. 4 illustrates a three dimensional view of one embodiment of the anticlastic structure.
Figure 5:
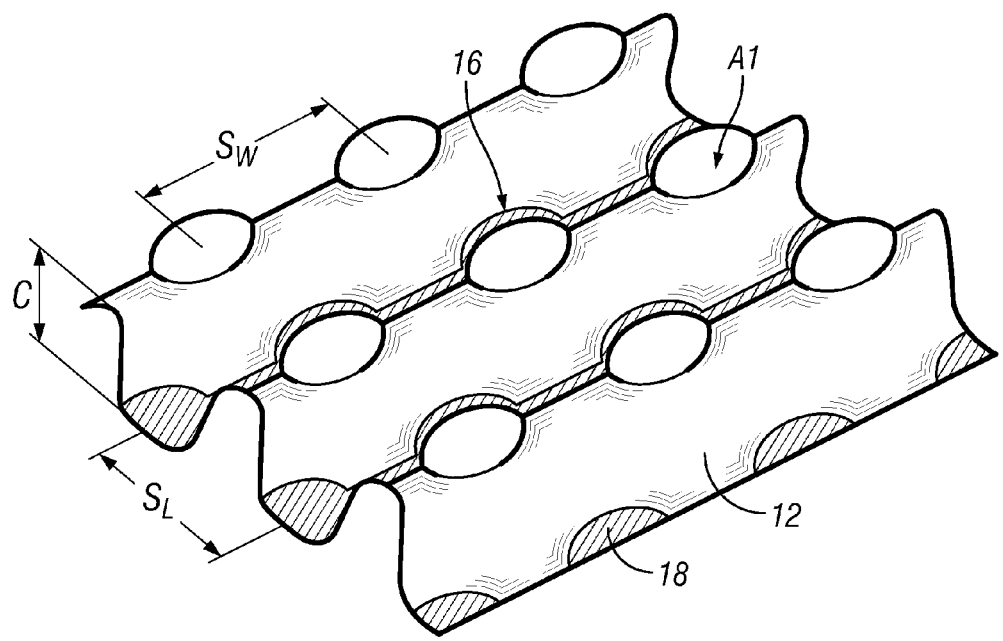
FIG. 5 illustrates one embodiment of an uni-directional corrugated sheet with periodically enlarged bonding lands.

Referring to FIGS. 1-9(a) and 9(b), in one embodiment of the present invention, a sandwich structure 10 is provided that is a three layer structure. The sandwich structure 10 includes an anticlastic core structure; hereafter a corrugated layer 12, also known as a core, with at least one core layer (structure) made of a periodic array of adjacent truncated upward facing peaks 16 and truncated downward facing valleys 18. Each truncated peak 16 has a bonding land of an area A1, FIG. 3. Each truncated valley 18 has a bonding land of an area A2. A ratio of A1/A2 is less than 2 and larger than 0.5. A distance $S_L$, FIG. 3, is between neighboring peaks 16, and a distance $S_L$ is also between neighboring valleys 18, in L-direction. Whereas a distance $S_W$ is between neighboring peaks 16, and a distance $S_W$ is also between neighboring valleys 18, in W-direction. The ratio of the smaller distance $S_{min}=\min\{S_L,S_W\}$ and the larger distance $S_{max}=\max\{S_L,S_W\}$ is equal or greater than 0.5. The smaller distances $S_{min}$ being equal or smaller than 200 mm and the larger distance, $S_{max}$, being equal or larger than 5 mm.

The corrugated layer 12 is made from an initially flat sheet thickness of t.

A first sheet layer 20 is physically coupled to bonding lands 22 of the truncated peaks 16. A second sheet layer 24 is physically coupled to bonding lands 26 of the truncated valleys 18.

Figure 6:
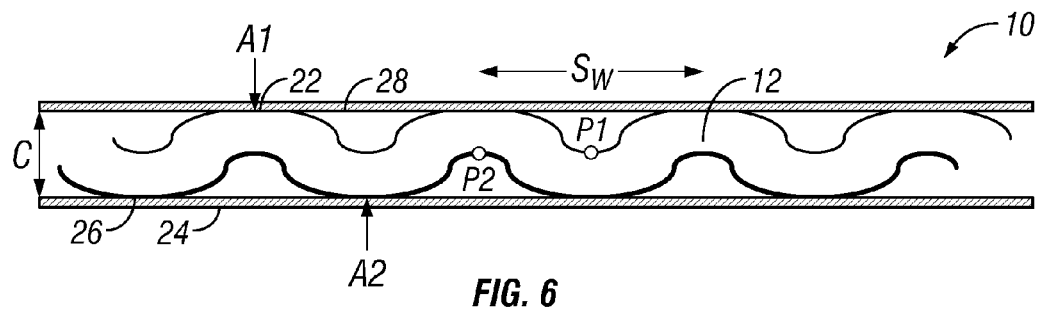
FIG. 6 illustrates a side view of one embodiment of the sandwich panel of the present innovation with a anticlastic core structure and two face sheets bonded onto truncated peaks and valleys.

The bonding land area A1, FIG. 6, is a contact area that transmits stress between a peak of the core structure and a first sheet. The bonding land area A2 is a contact area that transmits stress between a valley of the core structure and a second sheet. A ratio of A1/A2 is less than 2 and greater than 0.5.

In one embodiment, each bonding land 22 and 26 has a maximum curvature of less than 0.2/t. In one embodiment, a total corrugated core layer height after the sandwich structure 10 is formed is C, and a ratio of t/C is less than or equal 0.15.

In one embodiment, a total corrugated core layer height after the sandwich structure 10 is formed is C, and a ratio of t/C is less than or equal 0.15 and greater than 0.02.

In one embodiment, the ratio of $A1/S_{min}^2$ can be greater than 0.02 and the ratio of $A1/S_{max}^2$ can be less than 0.5.

In one embodiment, the ratio of $A2/S_{min}^2$ can be greater than 0.02 and the ratio $A2/S_{max}^2$ can be less than 0.5.

In one embodiment, a ratio of $C/S_{min}$ is less than 1.0 and greater than 0.2.

The core structure can be made of initially flat sheet material. In various embodiments, the sheet material can be metal such as flat steel sheets, flat aluminum sheets and the like.

In one embodiment, the steel sheet has a thickness greater than 0.1 mm and less than 0.6 mm. In one embodiment, the aluminum sheet has a thickness greater than 0.05 mm and less than 1.5 mm.

In one embodiment, the performance of the sandwich structure 10 depends on the topology of the porosity. Porosity is provided in the form of open, closed and combinations of these mixed together, as well as intermixing multiple materials to create these structures. In one embodiment, optimally designed cellular solids are provided with multifunctional possibilities. In one embodiment, many sheet materials, including but not limited to metals, polymers, composites and the like, can be shaped into cellular, anticlastic architectures comprising a periodic array of adjacent truncated upward facing peaks and truncated downward facing valleys as described above. The corrugated layer 12 structure can be created through stamping, progressively stamping or roll embossing process, as illustrated in FIGS. 9-12. The process of manufacture can be provided to control the porosity in three dimensional space. The wall thickness does not necessarily have to be uniform throughout the structure, nor needs the initial metal sheet be imperforated. When bonded together with face sheets or with other core layers by gluing, welding, brazing or other methods at truncated peaks and valleys, a sandwich structure of high bending stiffness and strength is obtained. The bond transfers the shear forces from the face sheets into the core structure. In a mass production of the sandwich structure, adhesively bonding can be utilized due to continuous production using roll coating equipment and laminating machines. A controlled pressure can then be provided on the sandwich panel while the adhesive cures. In various embodiments and for specific applications, brazing or welding by laser, resistance, arc and the like can be used.

In one embodiment, the sandwich structure is made by methods including at least a portion disclosed in U.S. Pat. No. 5,851,342, fully incorporated herein by reference. In another embodiment, the sandwich structure is made by methods at least a portion disclosed in U.S. Pat. No. 7,997,114, fully incorporated by reference. It will be appreciated that other methods of manufacture can be utilized.

EXAMPLE 1

Figure 1A:
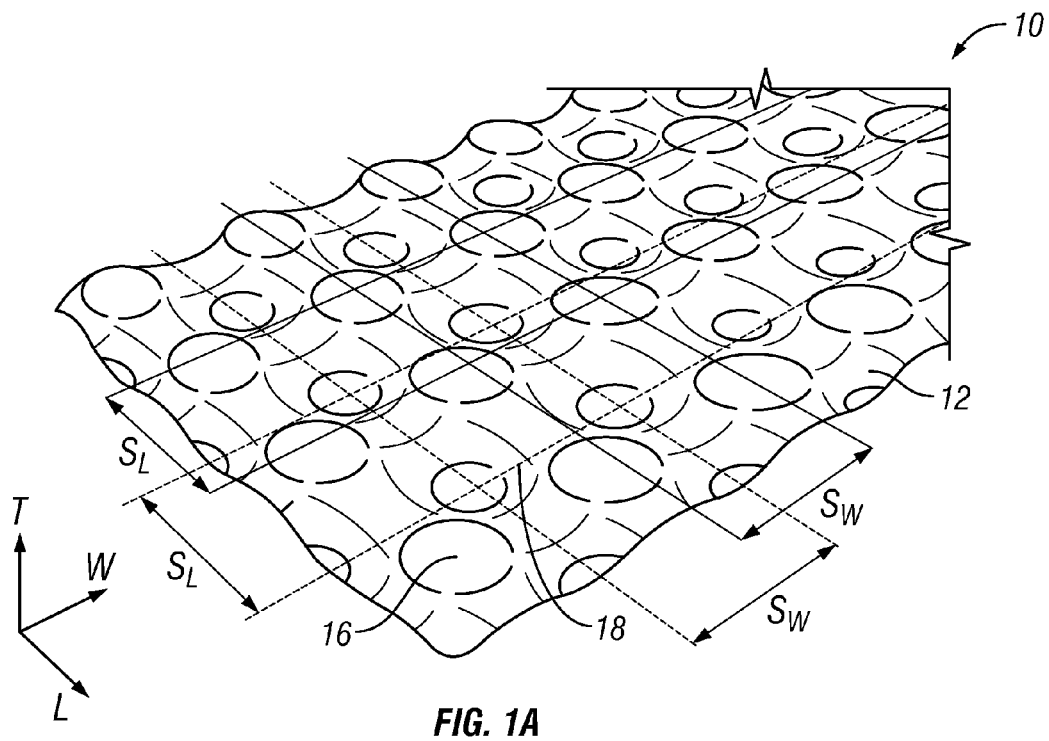
FIGS. 1A and 1B illustrate one embodiment of a sandwich structure of the present invention with an anticlastic core with truncated upwards facing peaks and downwards facing valleys.
Figure 1B:
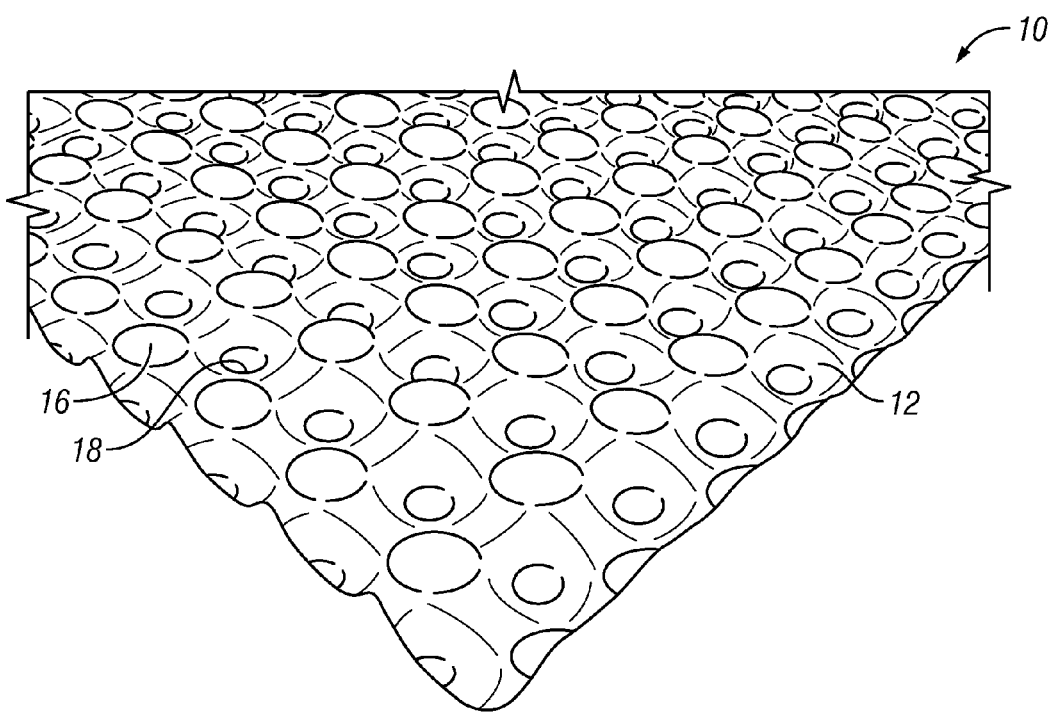
Figure 2A:
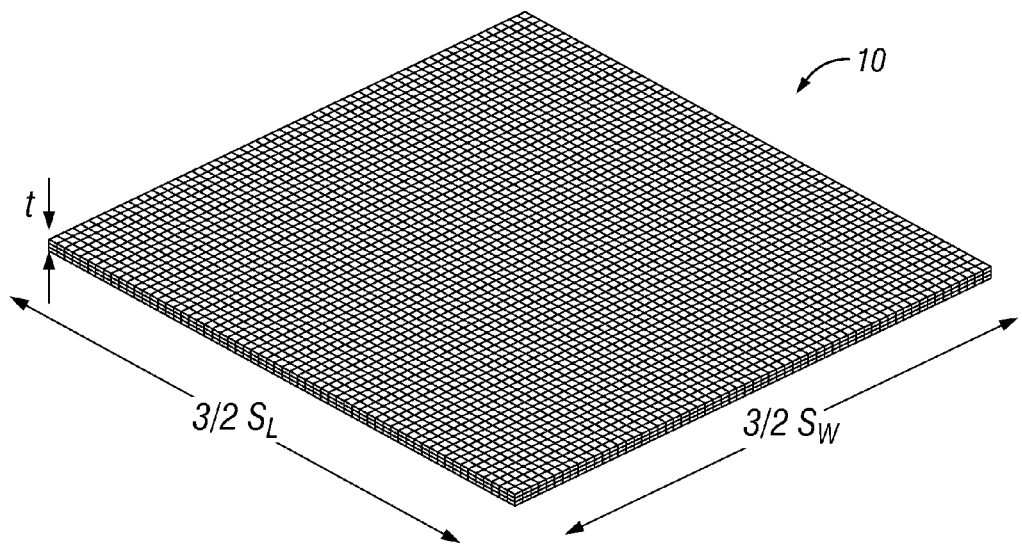
FIGS. 2A and 2B illustrate one embodiment of a sandwich structure of the present invention with a flat sheet that has an initial thickness formed into a bi-directionally corrugated, anticlastic structure.
Figure 2B:
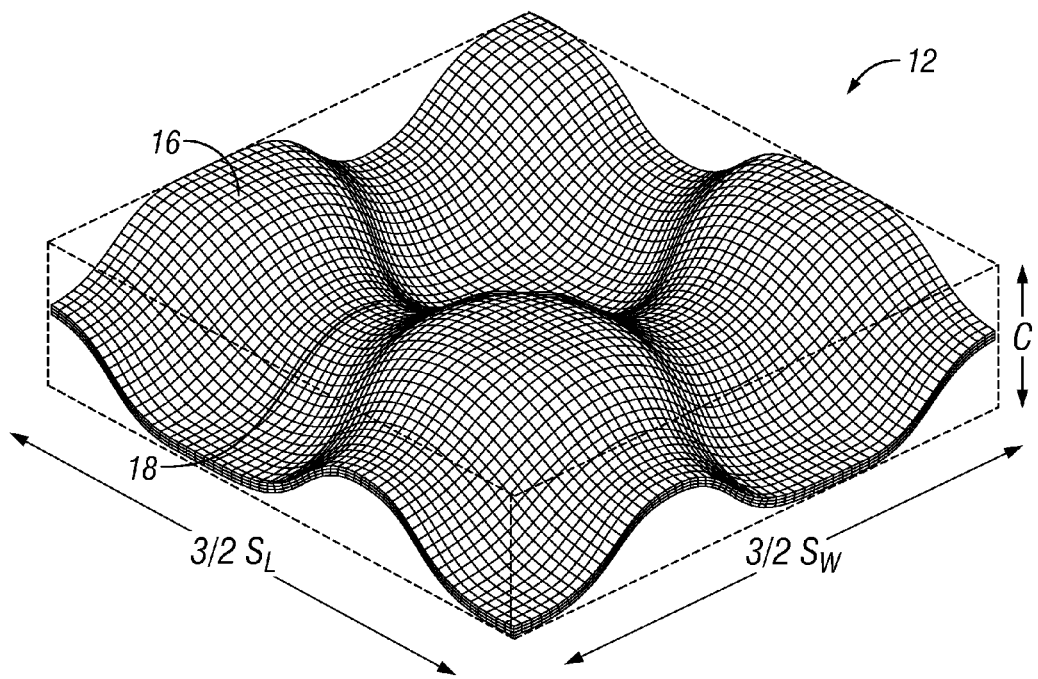

FIGS. 1A and 1B show a prototype which includes corrugated layer 12 structures which has been made through a) stamping, b) progressive stamping. A 0.2 mm thick commercial grade steel has been used as basis material. It is stamped into an corrugated layer 12 layer of a total thickness of a) 4.3 mm and b) 5 mm.

EXAMPLE 2

Figure 7:
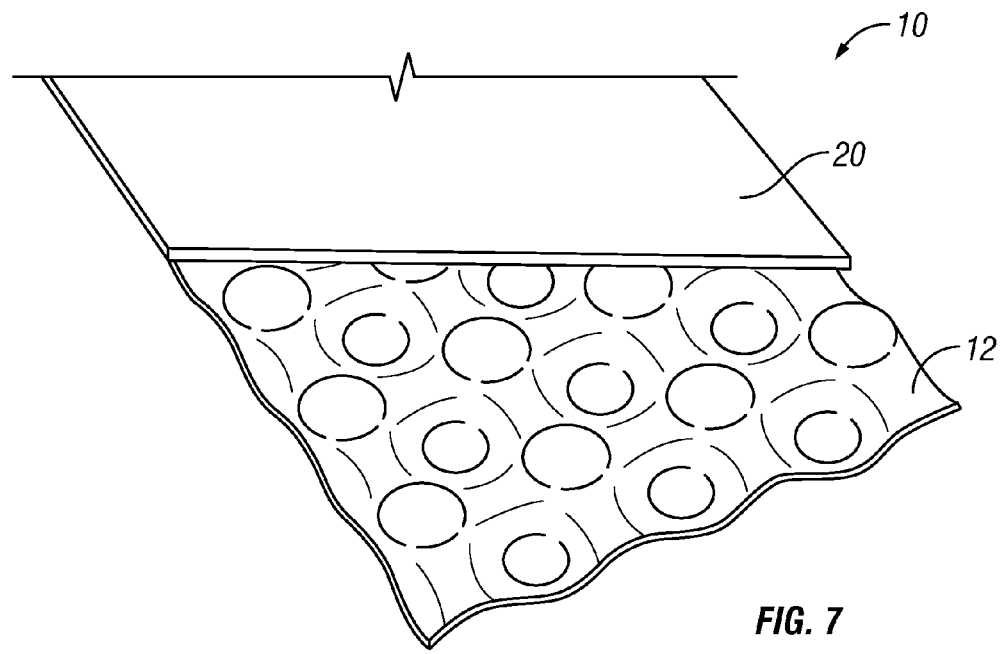
FIG. 7 illustrates one embodiment of a sandwich panel of the present invention with an anticlastic core structure and two face sheets bonded onto truncated peaks and valleys.

A prototype is shown in FIG. 7 where the total thickness of the sandwich panel is 6 mm. The basis material of the core and the skins is 0.4 mm thick aluminum.

Figure 8:
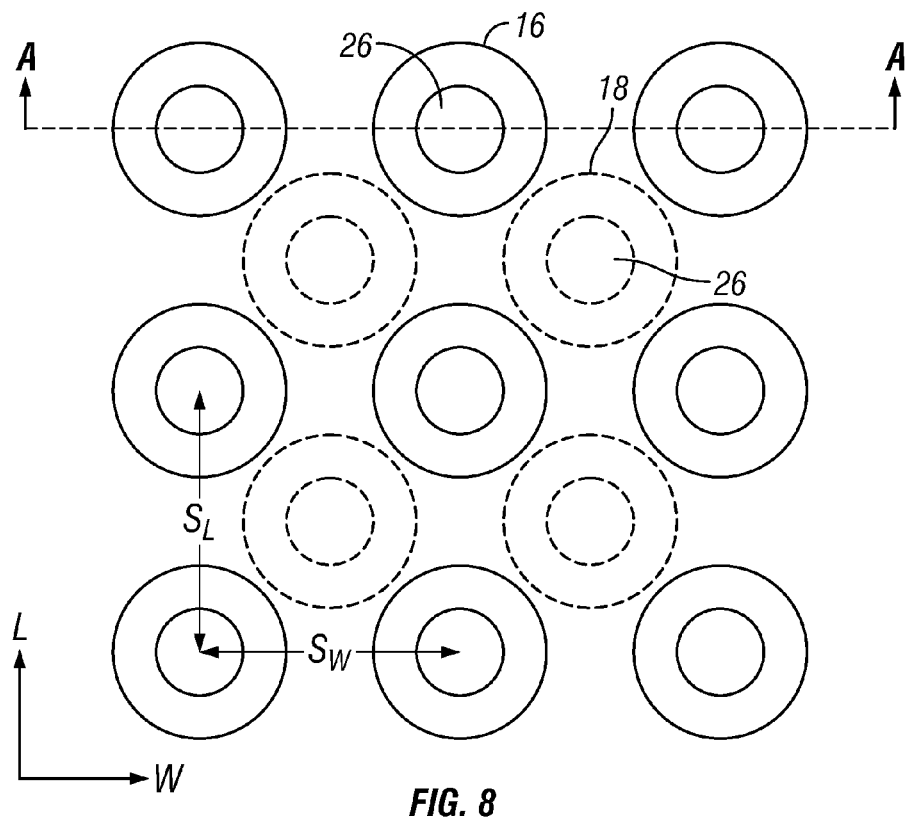
FIG. 8 illustrates the schematic of the pin pattern
Figure 9A:
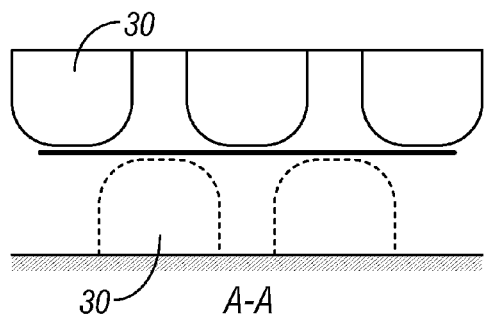
FIGS. 9A and 9B illustrate the schematic stamping operation from the side view (A:A)
Figure 9B:
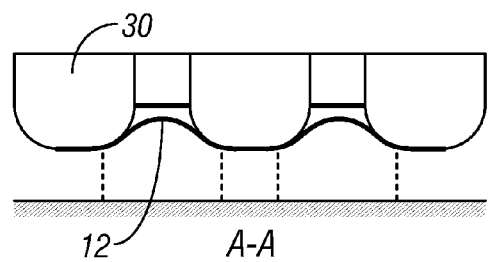
Figure 11A:
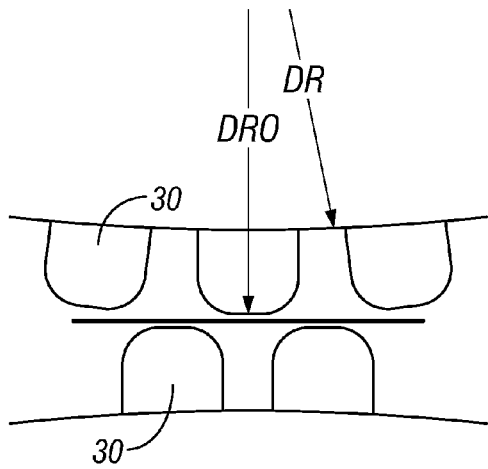
FIGS. 11A and 11B illustrate a schematic of the embossing tool (open and closed)
Figure 11B:
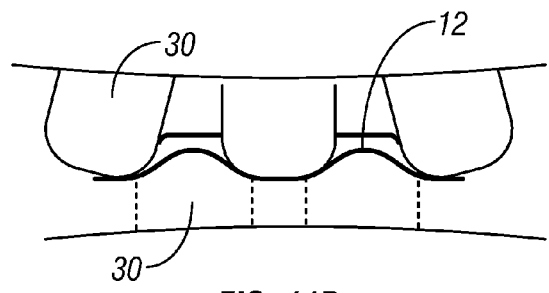

In one embodiment of the present invention, two critical failure mechanisms of the sandwich structure with an corrugated layer 12 structure, as is shown in FIG. 7, are face sheet buckling and delamination. FIG. 8 is a schematic of a pin pattern of one sheet of the pin structure that is used to create the corrugated layer 12 structure in one embodiment of the present invention. The pin structure includes two sheets of pins 30 that are pressed together with a layer of material between them to form the corrugated layer 12 structure (FIGS. 9A and 9B) FIG. 9A shows the essentially flat layer while FIG. 9B illustrated the formed corrugated core. Both the bonding land areas A1, A2 and the distances $S_L$, $S_W$ between the neighboring pins define the corrugated layer 12 structure. FIGS. 11A and 11B show similar pins except that can be curved. Optimization of these parameters is crucial in reducing the likelihood of the occurrence of face sheet buckling and delamination and other failure mechanisms as mechanical loading on the sandwich structure is increased.

Figure 10:
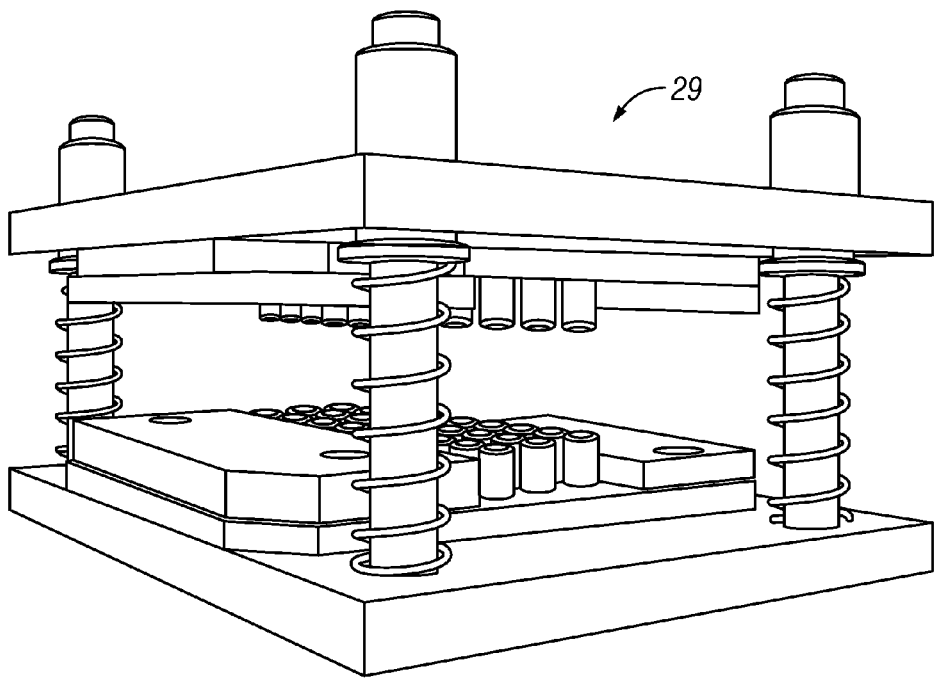
FIG. 10 illustrates one embodiment of a tool that can be used to make the anticlastic core structure through progressive stamping.

FIG. 10 illustrates one embodiment of a tool 29 that can be used to make the anticlastic core structure through progressive stamping.

EXAMPLE 3

Figure 12:
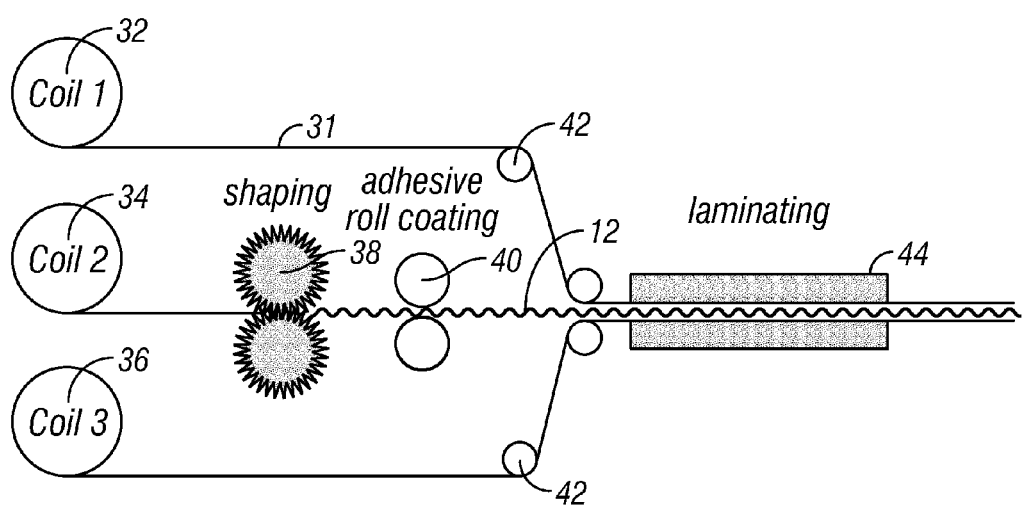
FIG. 12 illustrates one embodiment of a tool that can be used to make the anticlastic core structure through embossing.
Figure 13:
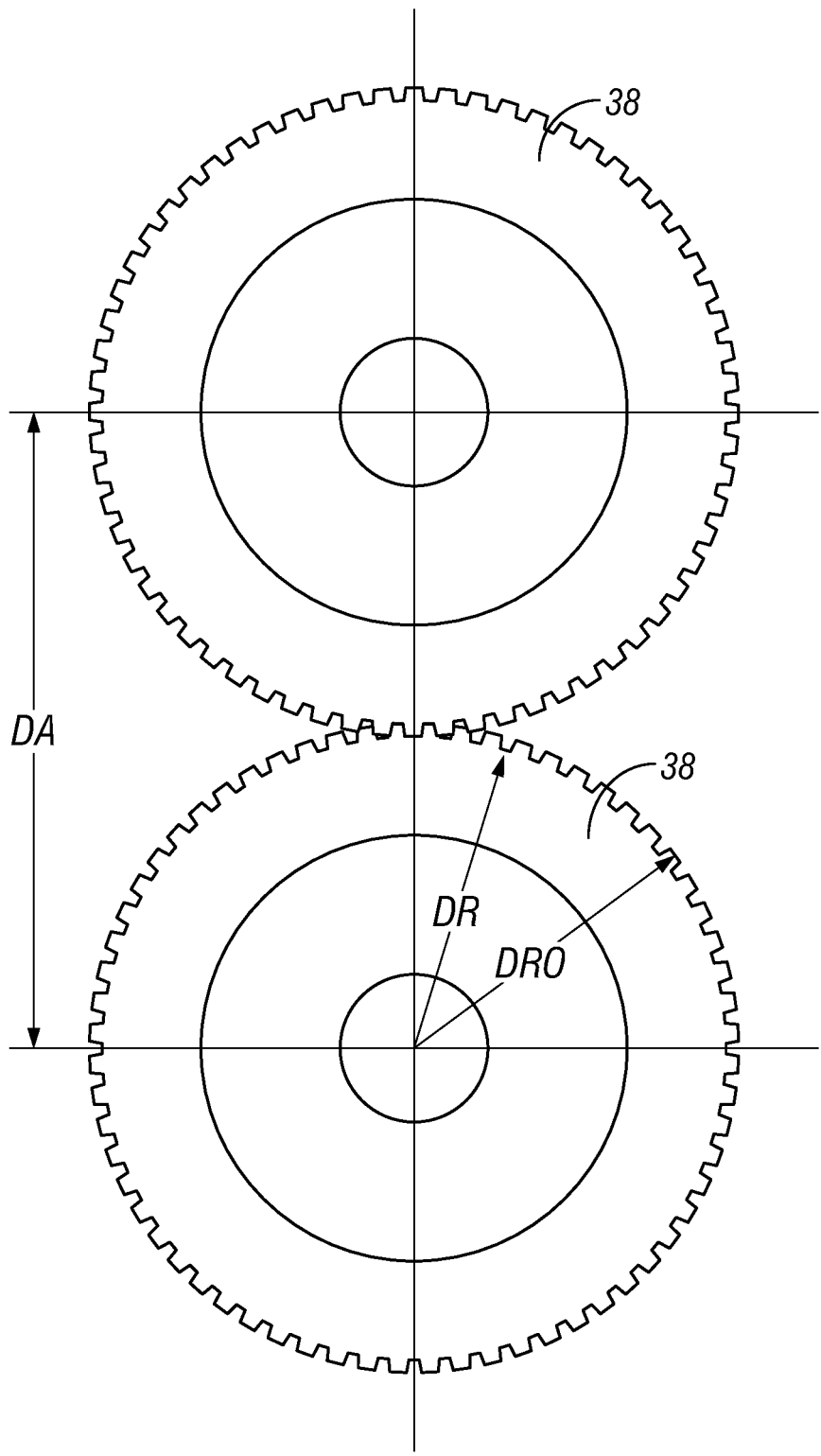
FIG. 13 illustrates one embodiment of a tool that can be used to make the anticlastic core structure through embossing.
Figure 14:
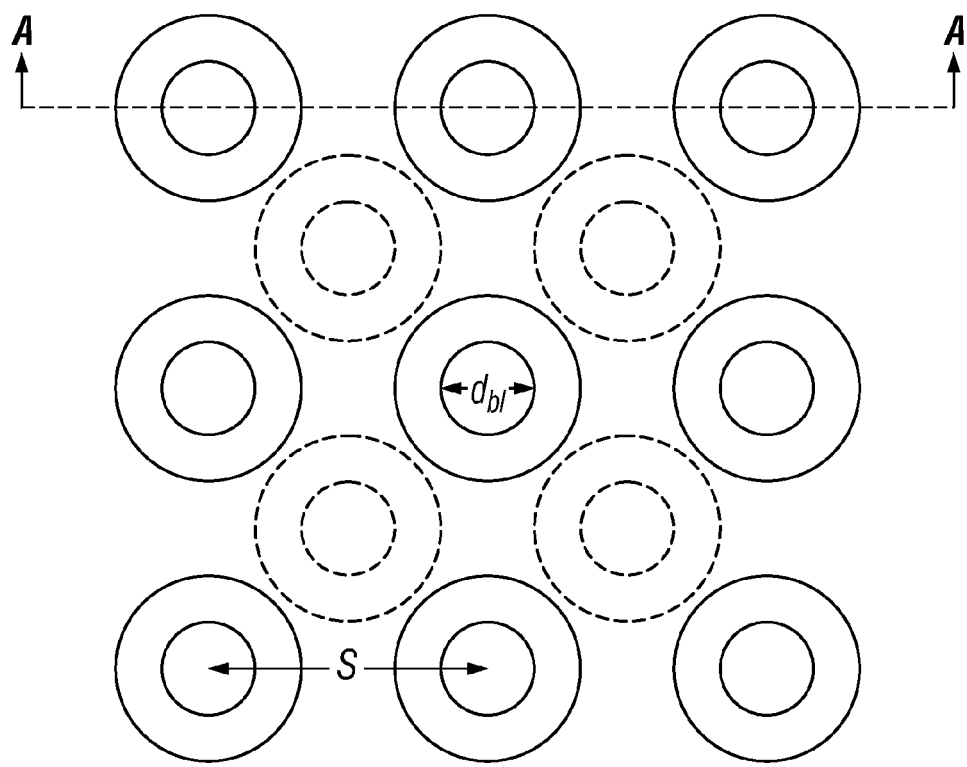
FIG. 14 illustrates a schematic of a pin pattern of one sheet of the pin structure that is used to create the anticlastic core structure in one embodiment of the present invention.

This example illustrates embodiments of a tool 31, FIGS. 12 and 13, that can be used to make the anticlastic core 12 structure through embossing. In this embodiment, three coils, 34-36, are shaped by teethed shaping members 38, two adhesive roll coating members 40, various rollers 42 that serve as guides, and a laminating device 44 to application one or more layers of lamination to the core structure 12.

$$\phi = \frac{d_{bl}}{S}$$

the difference between the diameter of the flat area of the pins $d_{bl}$ in the pin structure that create the bonding land areas (e.g. A1 and A2) in the anticlastic core structure and the distance S. In one embodiment, $\phi$ is greater than or equal to 0.05 and less than or equal to 0.4. In another embodiment S is greater than or equal to 10 mm and less than or equal to 50 mm.

Figure 15A:
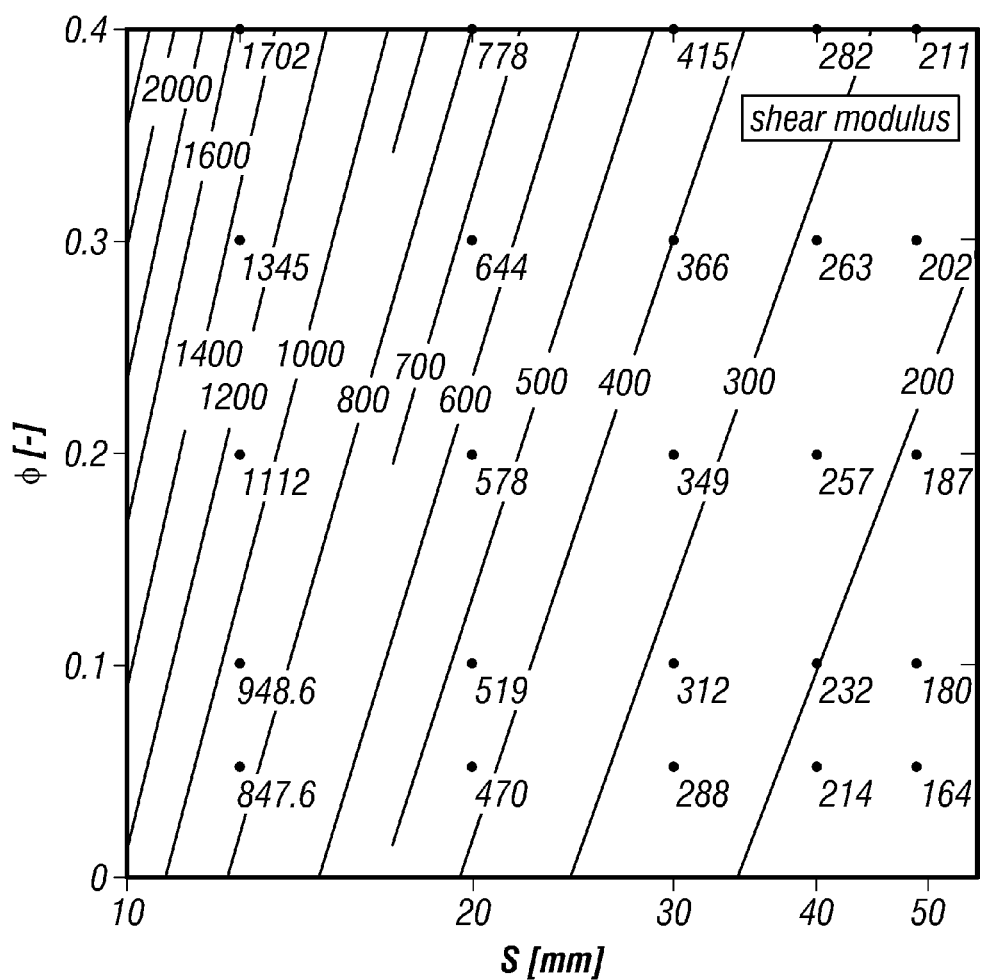
FIGS. 15A and 15B are plots of the transverse shear modulus and shear strength of the sandwich structure using an anticlastic core structure as a function of S and $\phi$.
Figure 15B:
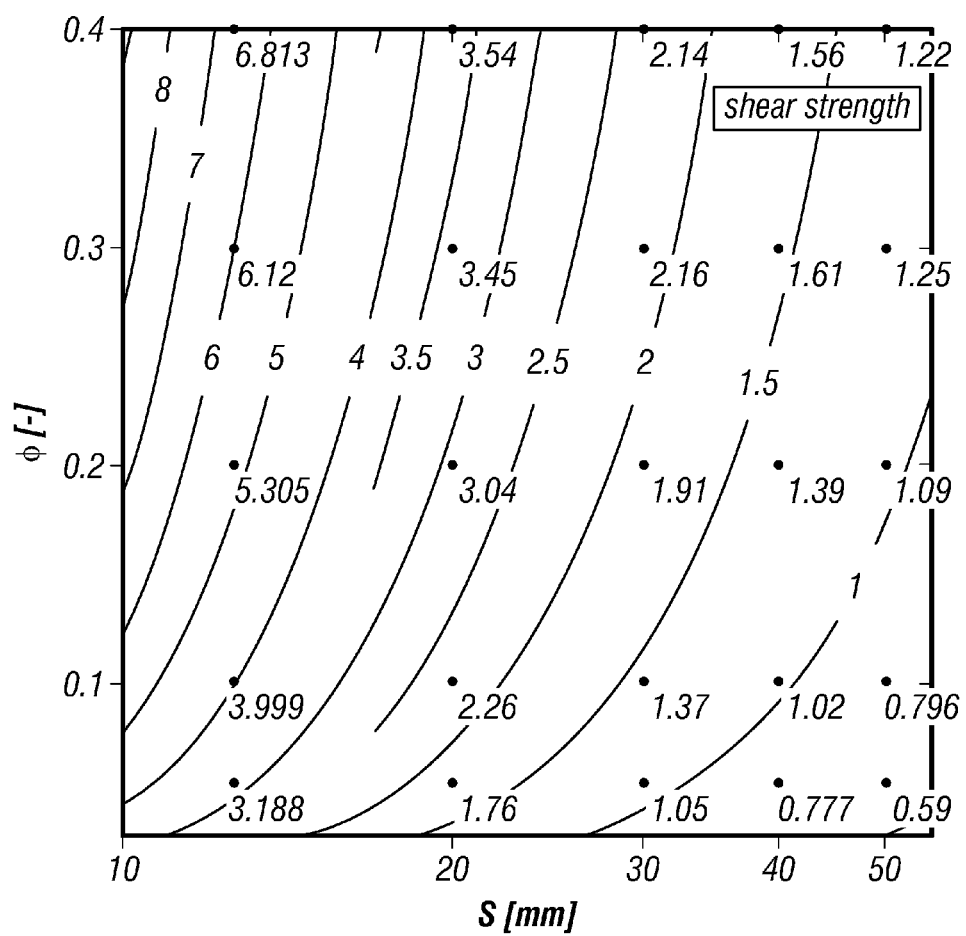

FIGS. 15A and 15B are plots of the transverse shear modulus and shear strength of the sandwich structure using an anticlastic core structure as a function of S and $\phi$. In one embodiment of the invention the shear modulus of the sandwich structure increases as S is decreased and $\phi$ is increased. In one embodiment, the shear modulus ranges from 164 Pa to over 2000 Pa. Specifically, a shear modulus of 1702 Pa is achieved for a sandwich structure with an anticlastic core structure that is created with a pin pattern with a $\phi$ of 0.4 and a S of around 13 mm. As shown in FIG. 15B, in one embodiment of the invention, the shear strength of the sandwich structure increases as S is decreased and φ is increased. In one embodiment, the shear strength ranges from 0.59 MPa to 6.813 MPa. Specifically, a shear strength of 6.813 MPa is achieved for a sandwich structure with an anticlastic core structure that is created with a pin structure with a φ of 0.4 and a S of around 13 mm. Shear strengths of almost 10 MPa are achieved for sandwich structures with anticlastic core structures created with a pin pattern with a φ of 0.4 and a S of 10 mm.

Figure 16:
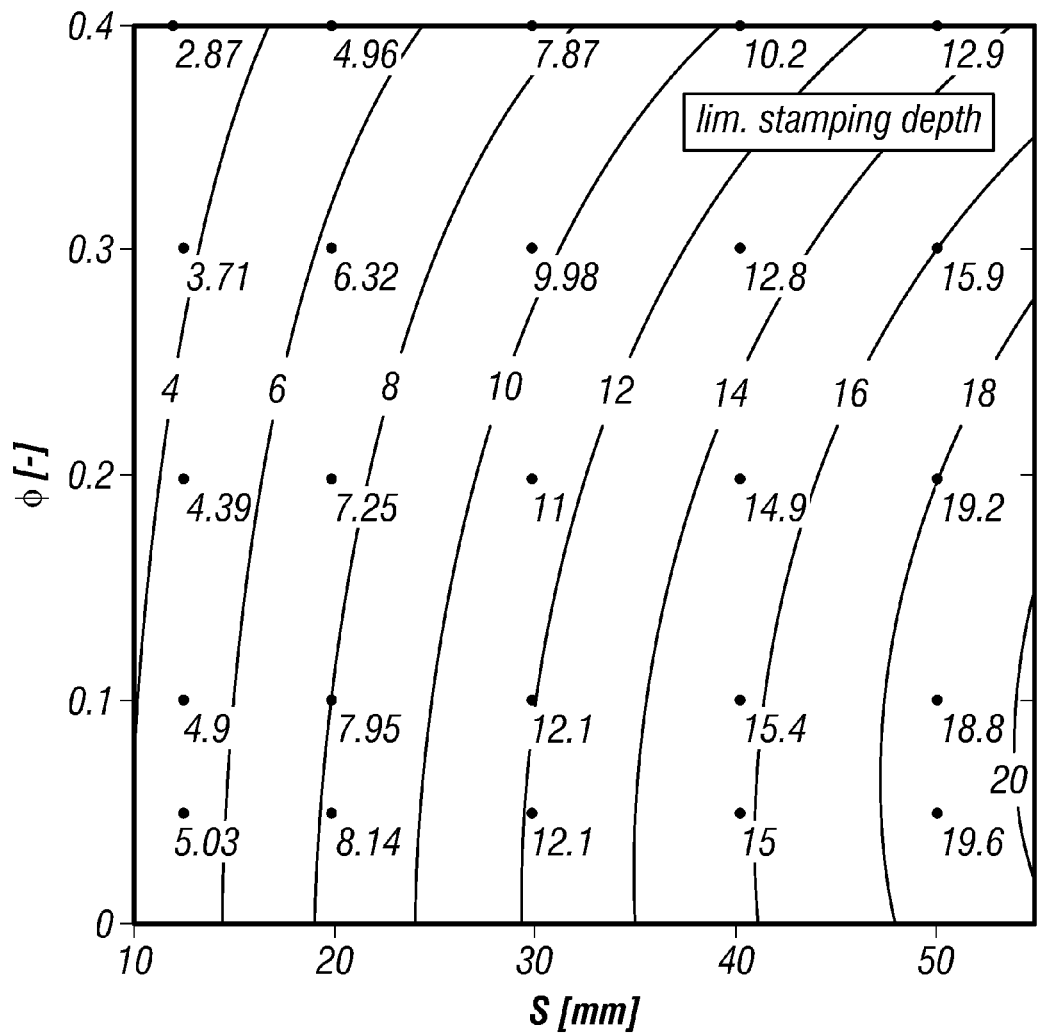
FIG. 16 is a plot of the stamping depth of the pin structure that is used to create an anticlastic core structure as a function of S and $\phi$.
Figure 17:
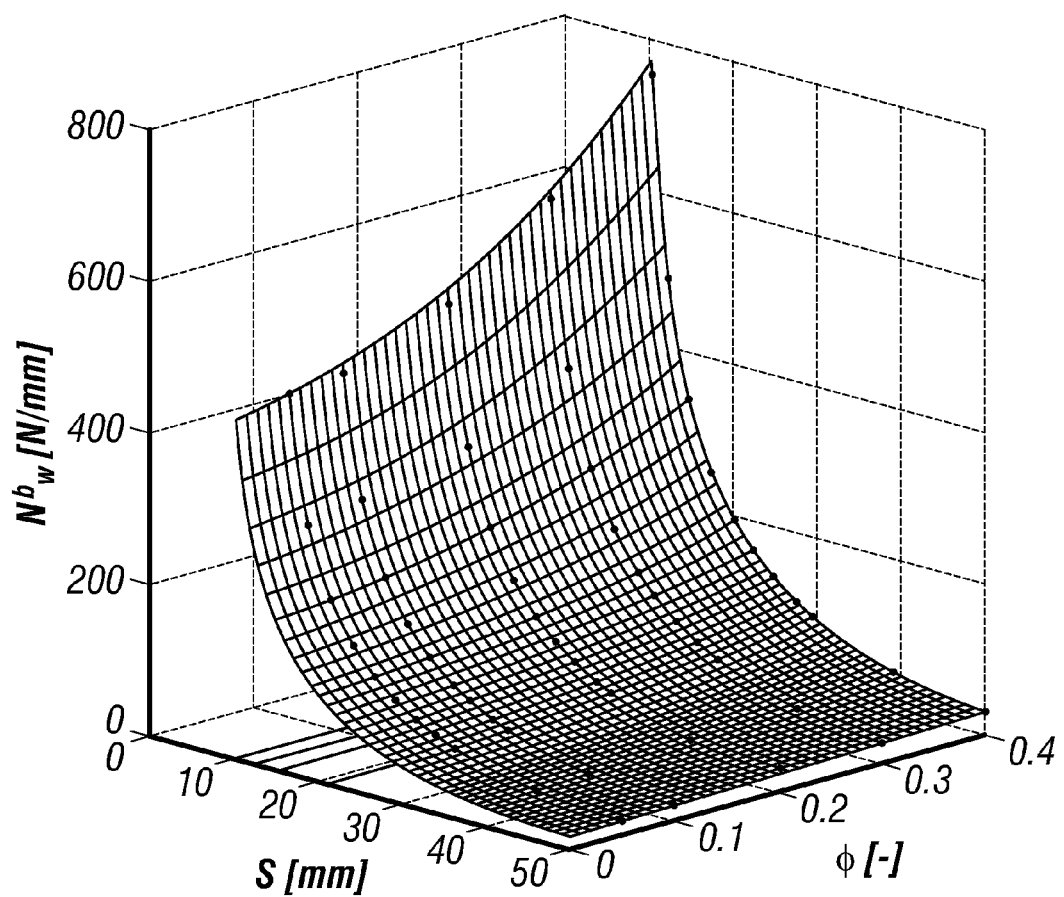
FIG. 17 is a plot of the force per unit width at which buckling occurs in the sandwich structure using an anticlastic core structure as a function of $\phi$ and S.

While, φ and S determine the strength of the sandwich structure with an anticlastic core structure, they also control the stamping depth at which the anticlastic core structure can be created. The stamping depth is the distance that the pins of the pin structure, such as that shown in FIG. 10, can be displaced into the sheet during formation of the anticlastic core structure, before the onset of fracture occurs. FIG. 16 is a plot of the stamping depth of the pin structure that is used to create an anticlastic core structure as a function of S and φ. As shown in FIG. 16, in one embodiment of the invention, the stamping depth increases as φ decreases and S increases. In one embodiment, the stamping depth ranges from 2.87 mm to 19.66 mm. Specifically, a stamping depth of 19.6 mm is achieved for an anticlastic core structure created with a pin pattern with a φ of around 0.05 and a S of around 50 mm.

φ and S also relate to the point at which buckling occurs in a sandwich structure with an anticlastic core structure under a given force per unit width. FIG. 17 is a plot of the force per unit width at which buckling occurs in the sandwich structure using an anticlastic core structure as a function of φ and S. As shown in FIG. 17, in one embodiment of the invention, the force per unit width at which buckling occurs dramatically increases as φ increases and S decreases. Specifically, in one embodiment, for a sandwich structure with an anticlastic core structure that is created with a pin pattern with a S of 10 mm and a φ of 0.4, the force per unit width at which buckling occurs is greater 600 N/mm.

Figure 18:
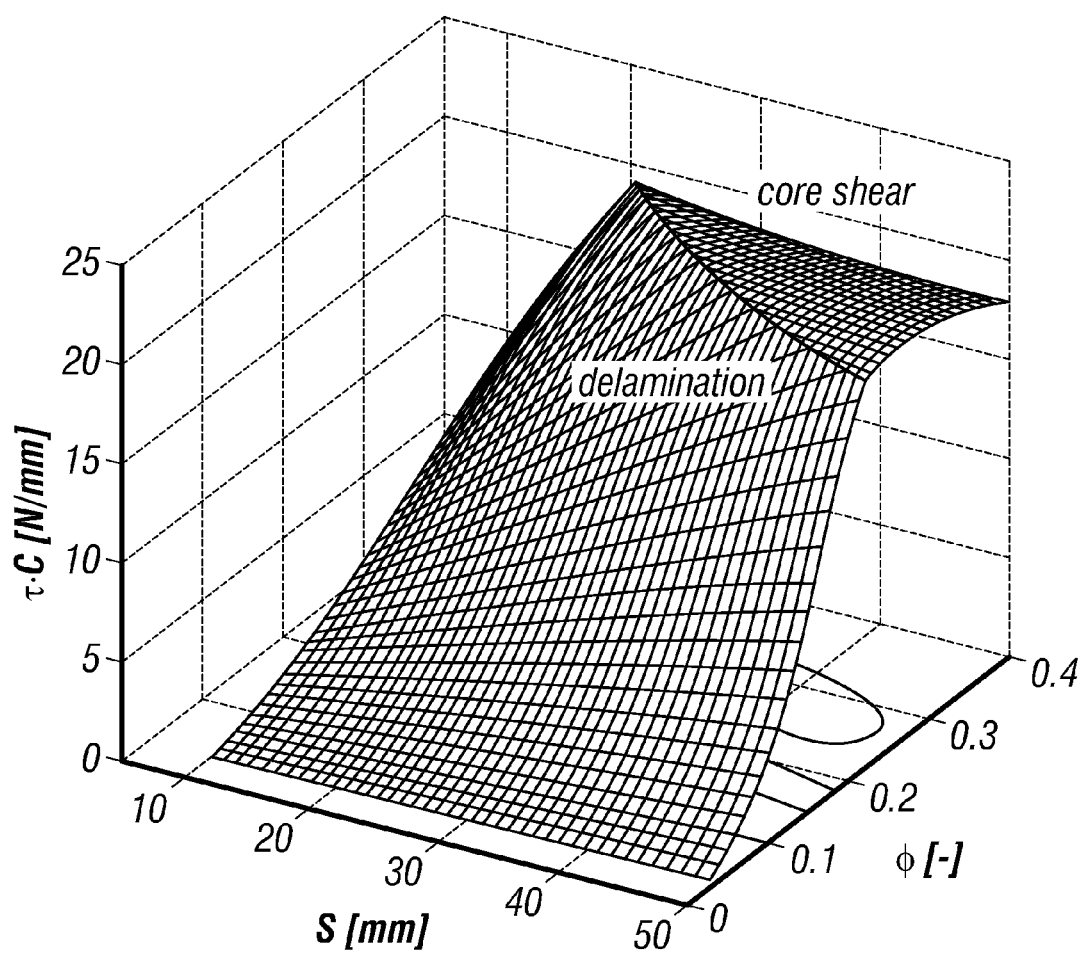
FIG. 18 is a plot of the shear force per unit width of a sandwich structure with an anticlastic core structure as a function of $\phi$ and S.

Delamination failure of the sandwich structure with an anticlastic core structure occurs at the maximum shear force per unit width of the structure, the shear strength. FIG. 18 is a plot of the shear force per unit width of a sandwich structure with an anticlastic core structure as a function of φ and S. As shown in FIG. 18, in one embodiment of the invention, the maximum shear load carrying capacity of the sandwich structure increases as φ increases. Additionally, as shown in FIG. 18, in one embodiment of the present invention, the maximum shear force per unit width increases as S increases. However, the maximum shear force per unit width only slightly increases as S is increased as opposed to the dramatic increase in maximum shear force per unit width as φ increases. Therefore, variations in φ have a larger effect on the maximum shear force per unit area of the sandwich structure as opposed to variations in S. In one embodiment a sandwich structure with an anticlastic core structure is created that can withstand a shear force per unit width of 18 N/mm before delamination occurs. The shear force per unit width at which the sandwich structure can withstand before delamination occurs is the load carrying capacity of the structure.

Figure 19:
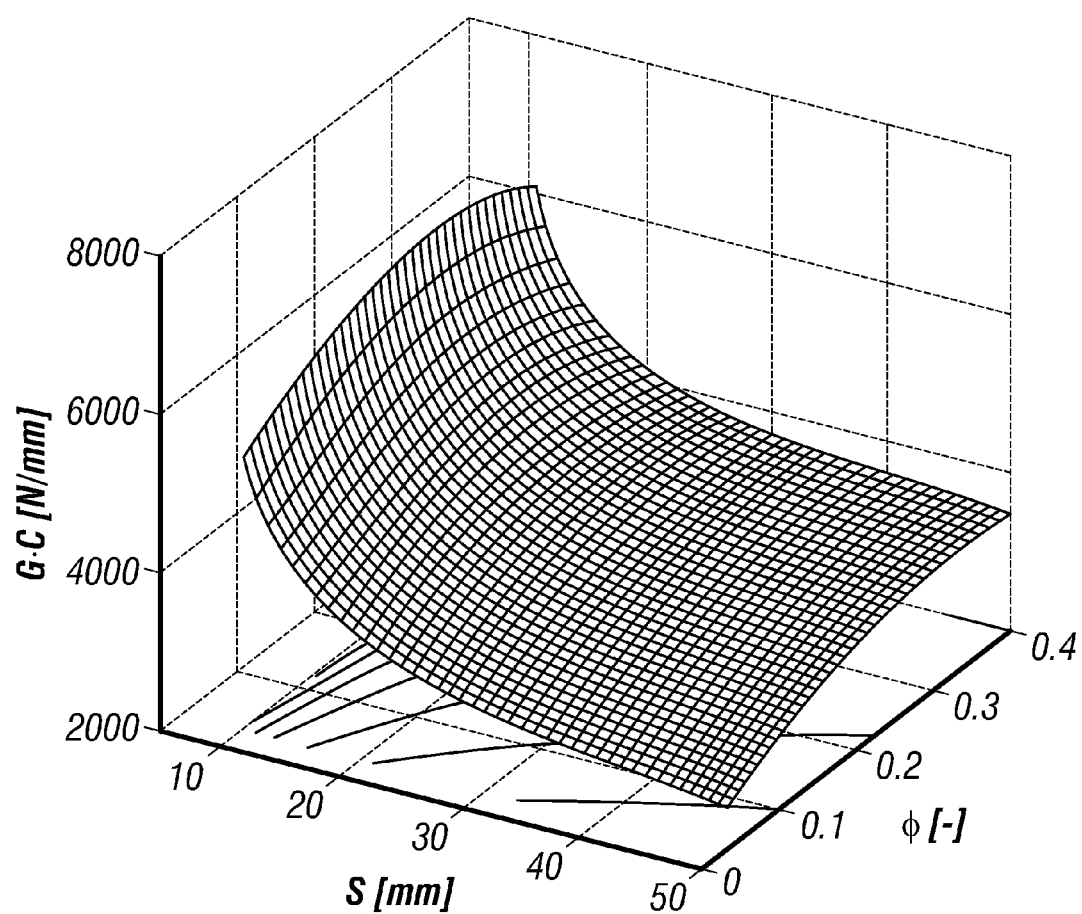
FIG. 19 is a plot of the shear stiffness of a sandwich structure with an anticlastic core structure as a function of $\phi$ and S.

FIG. 19 is a plot of the shear stiffness of a sandwich structure with an anticlastic core structure as a function of φ and S. As shown in FIG. 19, in one embodiment of the invention, the shear stiffness increases as S decreases and φ increases. The shear stiffness ranges from 2000 N/mm to 5500 N/mm. Additionally, a shear stiffness of 3000 N/mm exists for sandwich structures with anticlastic cores created by different pin structures that have a wide range of S values between 10 mm and 50 mm and φ values between 0.1 and 0.4.

Figure 20:
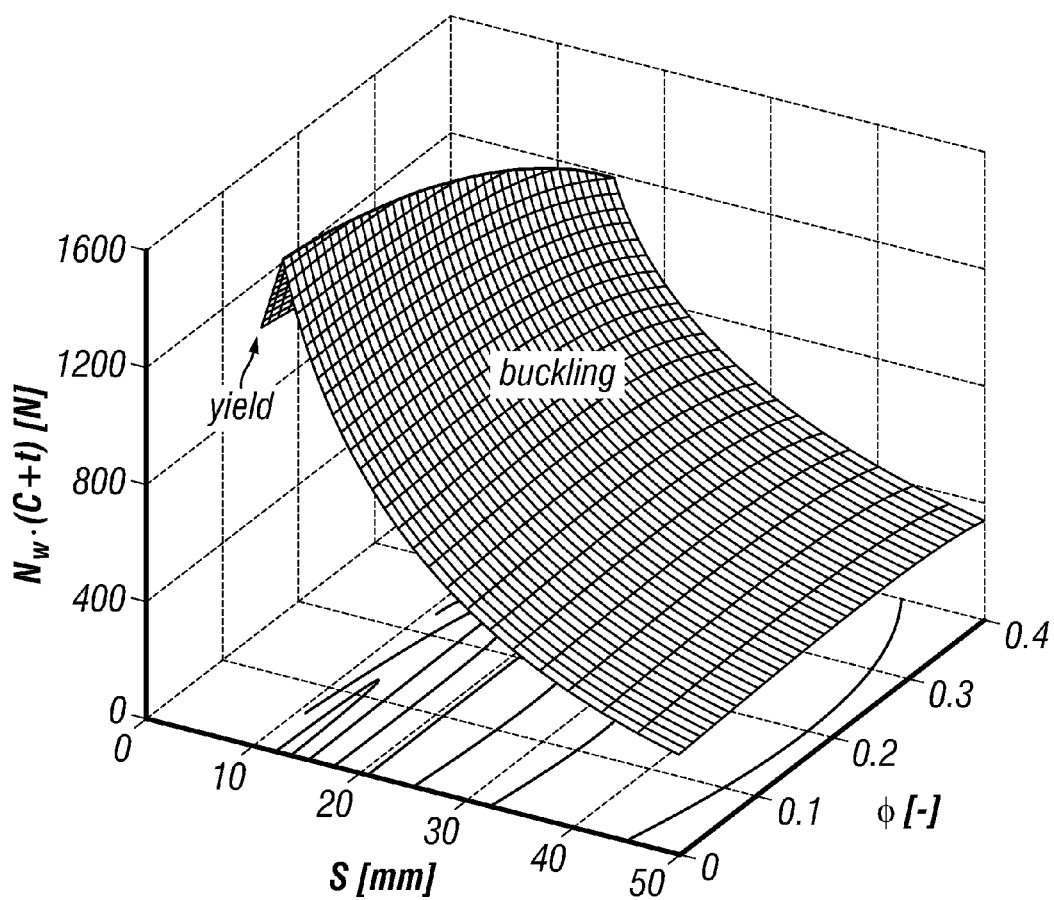
FIG. 20 is a plot of the critical bending moment of a sandwich structure with an anticlastic core structure as a function $\phi$ and S.

FIG. 20 is a plot of the critical bending moment of a sandwich structure with an anticlastic core structure as a function φ and S. The critical bending moment is represented by the total force that can be applied to the sandwich structure with an anticlastic core structure before buckling occurs or the yield point is reached. As shown in FIG. 20, in one embodiment of the invention, the critical bending moment for the sandwich structure with an anticlastic core structure increases as S decreases.

In one embodiment of the invention, the parameters φ and S that define the pin placement in the pin structure can be optimized. Specifically, the parameters are optimized with respect to core shear failure, delamination failure, buckling failure, and the reaching of the yield point. The parameters are also optimized in accordance with standards in metal construction (e.g. DIN-18.800), the maximum deflection shall not exceed b/200.

Figure 21:
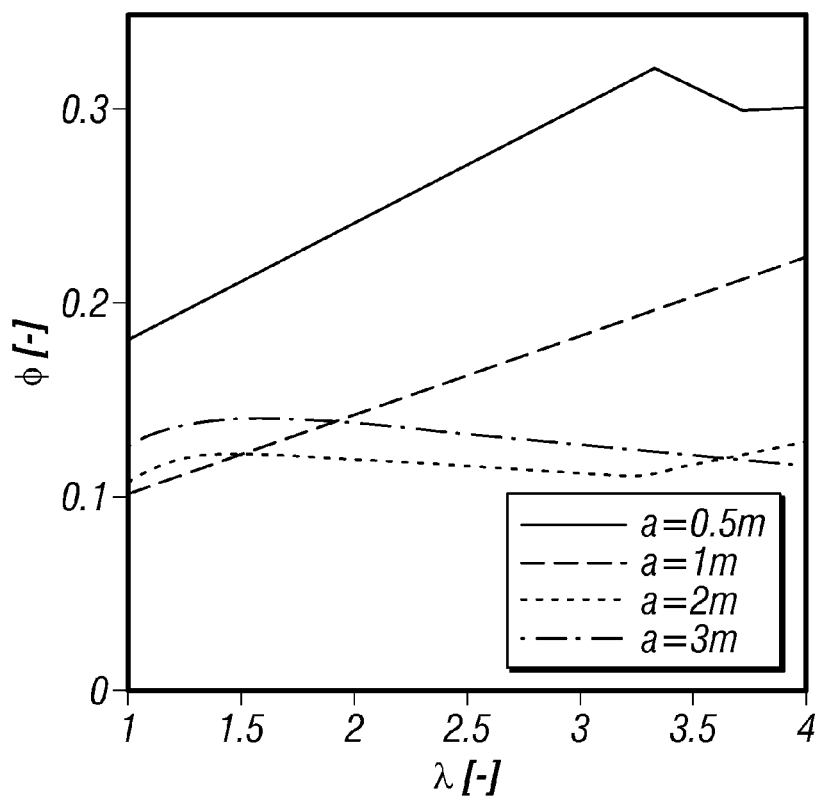
FIG. 21 is a plot of the bonding land parameter in one embodiment of the present invention as a function of the length-to-width ratio ($\lambda$) of a panel of the sandwich structure for various panel lengths according to one embodiment of the invention.

FIG. 21 is a plot of the bonding land parameter in one embodiment of the present invention as a function of the length-to-width ratio (λ) of a panel of the sandwich structure for various panel lengths according to one embodiment of the invention. The length and width are the magnitude of the distances of any of the corresponding sides of the panel that extend along directions that are orthogonal to each other. The optimized φ is shown for panel lengths of 0.5 m, 1 m, 2 m and 3 m. The optimized φ is shown for a length-to-width ratio (λ) from 1 to 4. As shown in FIG. 21, in one embodiment of the invention, for a panel length of 0.5 m the optimized φ for a sandwich structure with an anticlastic core structure is 0.18 and increases to above 0.3 as λ increases. The optimized φ for a panel length of 0.5 m then decreases at a λ of around 3.2 and levels off at 0.3.

In one embodiment of the invention, the optimized φ for a panel length of 1 m is 0.1 at a λ of 1 and increases roughly linearly to 0.22 at a λ of 4. In one embodiment, the optimized φ for a panel length of 2 m is 0.1 for a λ between 1 and 3.3 and begins to increase linearly for a λ between 3.3 and 3.5 to a value of 0.12. The optimized φ for a panel length of 3 m is around 0.13 for a λ at 1 and increases slightly to 0.14 before roughly linearly declining to a value of 0.11 for a λ at 4.

Figure 22:
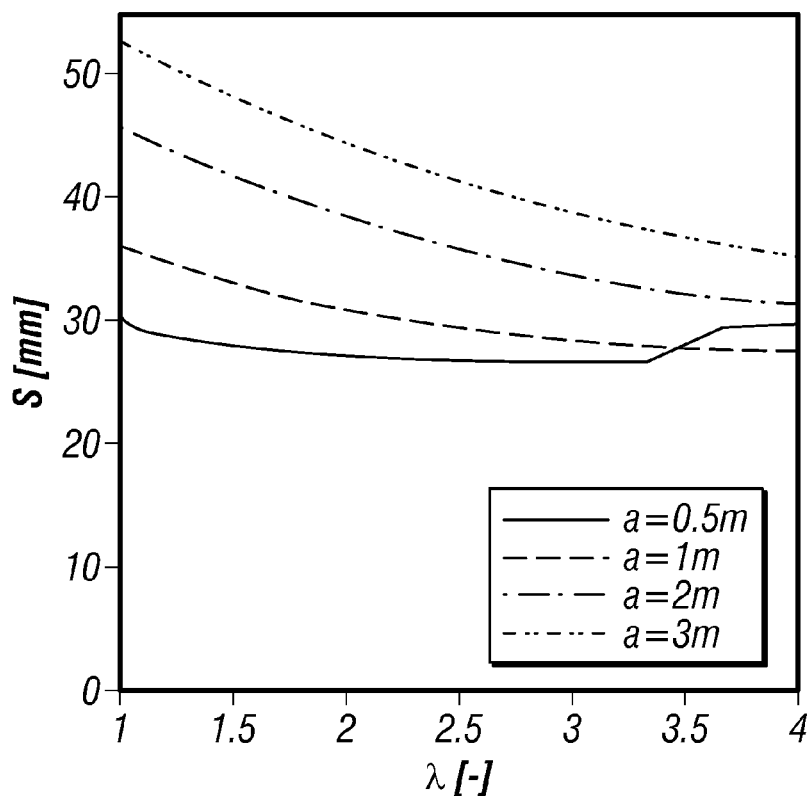
FIG. 22 is a plot of the optimized distance between neighboring pins as a function of $\lambda$ of a panel of the sandwich structure for various panel lengths according to one embodiment of the invention.

FIG. 22 is a plot of the optimized distance between neighboring pins as a function of λ of a panel of the sandwich structure for various panel lengths according to one embodiment of the invention. The optimized S is shown for panel lengths of 0.5 m, 1 m, 2 m and 3 m. The optimized S for a panel length of 0.5 m is 30 mm for a λ at 1, slightly decreased to 28 mm and then roughly linearly increases to 32 mm for a λ between 3.3 and 3.5 before leveling off at 32 mm. The optimized S for a panel length of 1 m is 36 mm for a λ at 1 and decreases to 30 mm for a λ at 4. The optimized S for a panel length of 2 m is 45 mm for a λ at 1 and decreases to 36 mm for a λ at 4. The optimized S for a panel length of 3 m is 52 mm for a λ at 1 and decreases to around 37 mm for a λ at 4.

Figure 23:
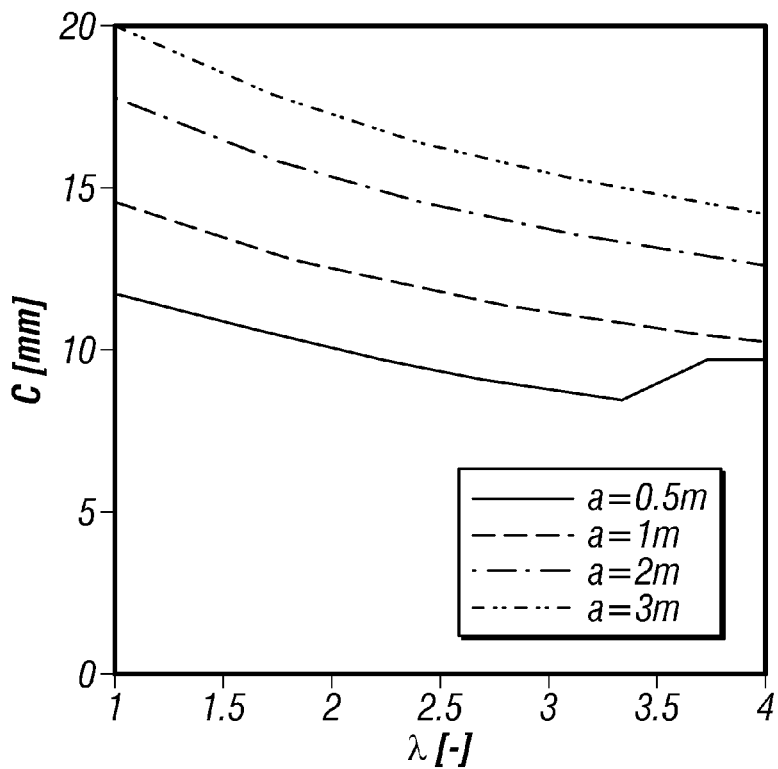
FIG. 23 is a plot of the optimized core thickness in one embodiment of the present invention of an anticlastic core structure a sandwich structure as a function of $\lambda$ of a panel of the sandwich structure for various panel lengths according to one embodiment of the invention.

FIG. 23 is a plot of the optimized core thickness in one embodiment of the present invention of an anticlastic core structure a sandwich structure as a function of λ of a panel of the sandwich structure for various panel lengths according to one embodiment of the invention. The optimized core thickness is shown for panel lengths of 0.5 m, 1 m, 2 m and 3 m. The optimized core thickness for a panel length of 0.5 m is 12 mm for a λ at 1 and decreases to 8 mm for a λ at around 3.3 before increasing to 10 mm for a λ at 4. The optimized core thickness for a panel length of 1 m is 14 mm for a λ at 1 and decreases to 10 mm for a λ at 4. The optimized core thickness for a panel length of 2 m is 17.5 mm for a λ at 1 and decreases to 13 mm for a λ at 4. The optimized core thickness for a panel length of 3 m is 20 mm for a λ at 1 and decreases to 14 mm for a λ at 4.

In one example of the invention, a steel sandwich structure with an anticlastic core structure is created. In this example steel sandwich structure, a total panel thickness of 7.2 mm is created with 0.4 mm thick 80 ksi steel face sheets, between which an anticlastic core structure is disposed. The anticlastic core structure was created using a pin structure with a pin spacing of about S 18.5 mm and a bonding land parameter of $\phi \cong 0.26$. The face sheets are bonded onto the anticlastic core structure using a high performance epoxy adhesive. Prior to bonding, the epoxy is pressed into 0.3 mm thick sheets. The solid epoxy sheets are then placed between the core and the face sheets before heating and curing the entire stack in a platen press to create the sandwich structure with an anticlastic core structure. The measured weight per unit area of this example steel structure is 10.4 kg/m$^2$ with a weight break down of 60% face sheets, 27% core structure and 13% adhesive.

In the example steel sandwich structure described in the previous paragraph, a load carrying capacity of 95.5 N/mm is achieved. The load carrying capacity of 95.5 N/mm corresponds to a shear stress of 4.5 MPa. Additionally, the shear stiffness of such example structure is 5440 N/mm.

In the light weight steel industry, efforts have been made to develop light weight structures using a high-density polyethylene (HDPE) foam core sandwich structure. One example sandwich structure using an HDPE core has a total thickness of 7.3 mm. The face sheets of the example HDPE core structure are each 80 ksi structural steel with a thickness of 0.4 mm. The HDPE foam core of the example structure has a density of 0.84 g/cm$^3$ and the example sandwich structure with an HDPE core structure has a weight per unit area of 11.7 kg/m$^2$.

The weight per unit area of the sandwich structure using an HDPE core structure is greater than the weight per unit area of the previously described example sandwich structure using an anticlastic core structure. Despite the greater weight per unit area, the sandwich structure using an HDPE core structure has a lower maximum load carrying capacity than the described example sandwich structure using an anticlastic core structure. Specifically the maximum load carrying capacity of the sandwich structure using an HDPE core structure is 45N/mm. This load carrying capacity is more than half of the maximum load carrying capacity of 95.5 N/mm of the example structure using an anticlastic core structure.

Another important parameter in designing light weight steel sandwich structures is the puncture resistance of the structures. Puncture resistance is the load applied by a hemispherical punch at which first cracks begin to form in the material. The puncture resistance of the sandwich structure using the anticlastic core structure depends on the pin spacing S and the φ in structure that is used to create the anticlastic core structure. The puncture resistance also depends on the height (C) of the anticlastic core structure.

Figure 24:
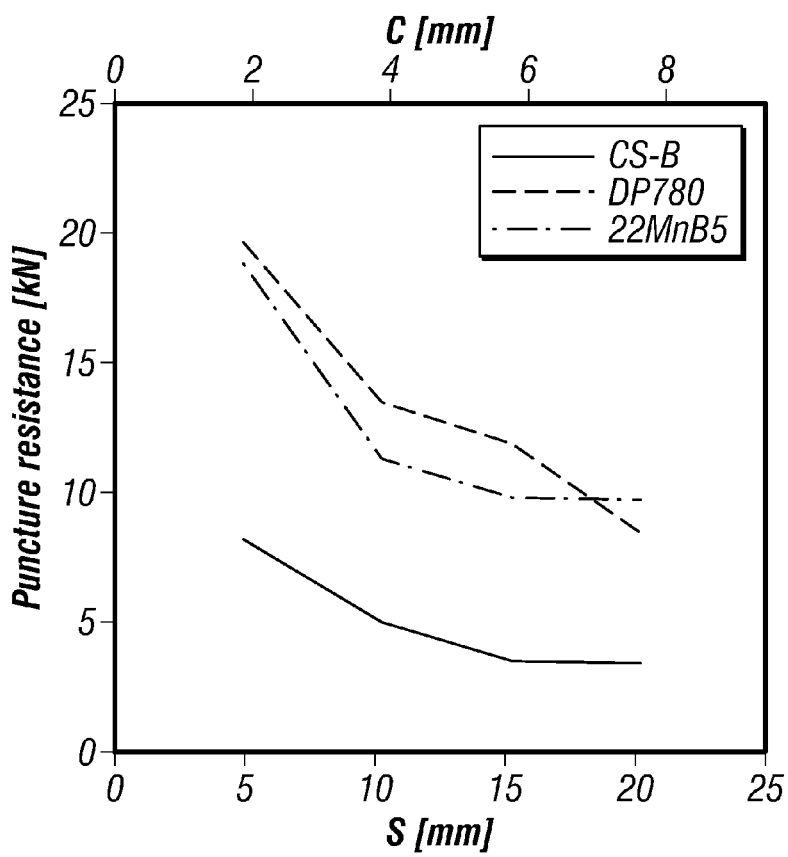
FIG. 24 shows the puncture resistance of sandwich steel structures with various face sheet materials using anticlastic core structures as a function of the pin spacing S and the anticlastic core structure height C.

FIG. 24 shows the puncture resistance of sandwich steel structures with various face sheet materials using anticlastic core structures as a function of the pin spacing S and the anticlastic core structure height C. The puncture resistances shown in FIG. 24 are created for sandwich structures with an anticlastic core structures created through a pin structure with a φ of 0.2. Specifically, the puncture resistance is shown in various embodiments in FIG. 24 for sandwich structures using face sheet layers fabricated from commercial steel (CS-B), dual phase steel (DP) and martensitic steel (MS) 22MnB5. As shown in FIG. 24, in one embodiment, the puncture resistance of the sandwich structures decreases as S and C increase. The sandwich structures using DP and MS face sheet layers have puncture resistances of 20 kN with a S of 5 mm and a C of 2 mm. The puncture resistance of the sandwich structures using DP decreases to 9 kN while the puncture resistance of the sandwich structure using MS decreases to 10 kN for a S of 20 mm and a C of 8 mm. The sandwich structure using CS-B face sheets has a puncture resistance of 8 kN with a S of 5 mm and a C of 2 mm and decreases to 4 kN with a S of 20 mm and a C of 7 mm.

In two other example sandwich structures A and B, the face sheet layers are 0.37 mm thick HS80 material and the anticlastic core structure is fabricated from a 0.3 mm thick CS-B material. In Example A of the sandwich structure the anticlastic core structure has a C of 4.1 mm and is fabricated with a pin structure with a S of 13.5 mm. In Example B of the sandwich structure the anticlastic core structure has a C of 2.8 mm and is fabricated with a pin structure with a S of 13.5 mm. The puncture resistance of Example A is 3 kN, while the puncture resistance of Example B is 4.2 kN. The difference in puncture resistance between Example A and Example B is attributed to the smaller C of Example B.

Figure 25:
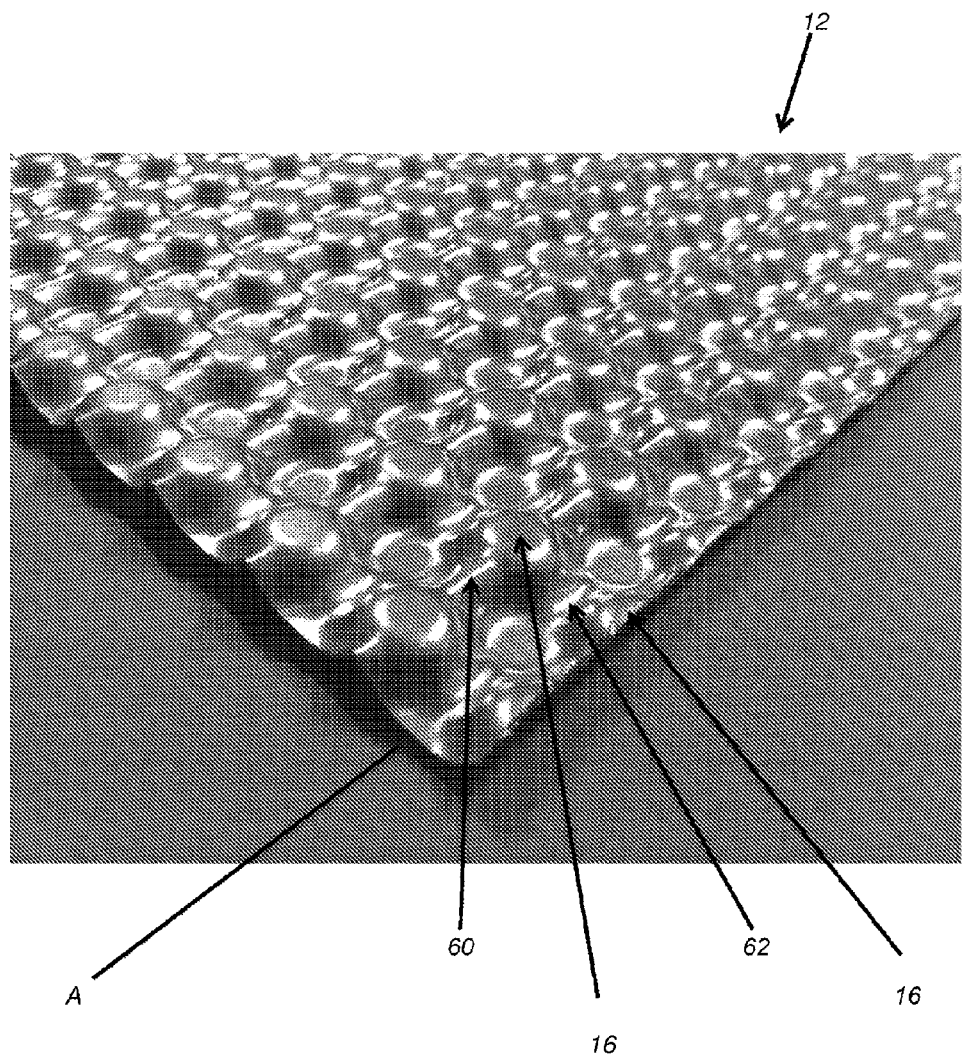
FIG. 25 is a perspective view showing an embodiment of a core layer used in a sandwich structure of the present invention.

Another embodiment of a core layer 12 of a sandwich structure is Illustrated in FIG. 25. Core 12 includes truncated peaks 16, each having bonding lands, and valleys. Raised ribs 60 bridge between adjacent peaks 16, extending substantially parallel to direction A. Furthermore, an abrupt depression 62 is located between each adjacent pair of peaks 16 in a substantially perpendicular direction to A. Thus, core 12 has a different rigidity and bending characteristic in one direction as compared to a direction perpendicular thereto.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A sandwich structure comprising:
   a core layer including truncated peaks and truncated valleys, and substantially flat and peripherally circular lands located at external surfaces of the peaks and valleys, with curved intersections between the peaks and side walls extending between the peaks and valleys;
   a substantially flat outer layer attached to at least some of the adjacent lands on the external surfaces on one side of the core layer;
   another substantially flat outer layer attached to at least some of the adjacent lands on the external surfaces on an opposite side of the core layer;
   raised ribs of the core layer bridging between adjacent of the peaks in a first direction and abrupt depressions located between adjacent of the peaks in a second direction substantially perpendicular to the first direction;
   the side walls having a substantially circular cross-sectional shape where they intersect the raised ribs; and
   the peaks and valleys being formed in the core layer by embossing rolls to prevent core fracture during forming.

2. The structure of claim 1, wherein the core layer is a single sheet of aluminum and the sandwich structure solely consists of the three layers with adhesive therebetween, and the core layer has a total formed thickness of at least 10 mm as measured between the opposite peaks and valleys.

3. The structure of claim 2, wherein the aluminum sheet has a thickness greater than 0.05 mm and less than 1.5 mm.

4. The structure of claim 1, wherein the core layer is a single sheet of steel and the sandwich structure solely consists of the three layers with adhesive therebetween, and the core layer has a total formed thickness of at least 10 mm as measured between the opposite peaks and valleys.

5. The structure of claim 4, wherein the steel sheet has a thickness greater than 0.1 mm and less than 0.6 mm, and the steel core sheet is embossed at room temperature with embossing pins each having a curved transition between a distal end and an elongated side wall.

6. The structure of claim 1, further comprising adhesive bonding together the layers at the lands, and the core layer having a different rigidity characteristics in the first versus second directions.

7. The structure of claim 1, wherein the entire sandwich structure has a puncture resistance of no less than 4 kN.

8. The structure of claim 1, wherein:
an area A1 of each of the lands transmits stress between at least one of the peaks of the core layer and an adjacent one of the sheets;
an area A2 of each of the lands transmits stress between at least one of the valleys of the core layer and the other of the sheets; and
a ratio of A1/A2 is less than 2 and greater than 0.5.

9. The structure of claim 1, wherein a distance between centerpoints of adjacent pairs of the peaks is 30-52 mm.

10. The structure of claim 1, wherein a distance between centerpoints of adjacent pairs of the peaks is 10-30 mm.

11. The structure of claim 10, wherein the attached sheets are a flat panel associated with a truck.

12. A sandwich structure comprising:
(a) a core layer, including truncated peaks and truncated valleys, the peaks being spaced apart from each other in all directions, each peak having a substantially flat and peripherally circular bonding area (A1) and each truncated valley having a substantially flat area (A2), the core layer having an initial thickness (t), and centers of the neighboring valleys being separated by a distance ($S_L$) in an L-direction and ($S_W$) in a W-direction, perpendicular to the L-direction, and raised ribs spanning between adjacent of the peaks in one of the W and L directions but not in the other of the W and L directions, each of the ribs having a curved cross-sectional outer shape;
(b) a first outer layer secured to and spanning between the peaks on one side of the core layer;
(c) a second outer layer secured to and spanning between the peaks on an opposite side of the core layer;
(d) wherein a total core layer height after the sandwich structure is formed is C, and a ratio of t/C is less than or equal 0.15 and greater than 0.02;
(e) wherein a distance between centerpoints of adjacent pairs of the peaks is 10-30 mm;
(f) wherein the layers are steel and the total sandwich has a weight of no greater than 11.7 kg/m$^2$;
(g) wherein the attached sheets define a sandwich panel used with a truck; and
(h) wherein the core layer is fed between embossing rollers, each including elongated projecting pins, to create the peaks and valleys therein, and the core layer has a total formed thickness of at least 10 mm as measured between the opposite peaks and valleys.

13. The structure of claim 12, wherein a ratio of A1/A2 is less than 2 and greater than 0.5.

14. The structure of claim 12, wherein a ratio of $S_L/S_W$ is less than or equal to 2 and greater than or equal to 0.5.

15. The structure of claim 12, wherein a smaller distance $S_{min}=\min\{S_L, S_W\}$ is less than or equal to 200 mm.

16. The structure of claim 12, wherein a larger distance $S_{max}=\max\{S_L, S_W\}$ is larger than or equal to 5 mm.

17. The structure of claim 12, wherein a ratio of $A1/S_{min}^2$ is greater than 0.02.

18. The structure of claim 12, wherein a ratio of $A1/S_{max}^2$ is less than 0.5.

19. The structure of claim 12, wherein a ratio of $CIS_{min}$ is less than 1.0 and greater than 0.2.

20. The structure of claim 12, wherein the core layer is continuously fed between the embossing rollers.

21. The structure of claim 12, further comprising foam located between first and second outer layers.

22. The structure of claim 12, wherein abrupt depressions are located between adjacent of the peaks in the direction substantially perpendicular to the direction aligned with the raised ribs, and a shear stiffness of the sandwich layers is at least 2000 N/mm.

23. A sandwich structure for use with a truck, the structure comprising:
at least one steel core sheet, roller embossed to include truncated peaks and truncated valleys, the peaks being spaced apart from each other in all directions, the core being made from an initially flat sheet, and each peak including a generally circular top view and a curved intersection to the adjacent cross-sectionally curved sidewall;
raised ribs of the core sheet bridging between adjacent of the peaks in a first direction and abrupt depressions located between adjacent of the peaks in a second direction substantially perpendicular to the first direction;
a first steel outer sheet attached to the truncated peaks with epoxy adhesive; and
a second steel outer sheet attached to the truncated peaks on an opposite side of the core sheet from the first outer sheet with epoxy adhesive;
the attached sheets have a shear force per unit width of at least 18 N/mm before delamination occurs;
weight per unit area of the attached sheets being no greater than 11.7 kg/m$^2$; and
a load carrying capacity of the attached sheets being at least 45 N/mm when used with the truck.

24. The structure of claim 23, wherein the attached core and outer sheets have a load carrying capacity of at least 95.5 N/mm.

25. The structure of claim 23, wherein the attached core and outer sheets have a shear stiffness of at least 5440 N/mm.

26. The structure of claim 23, further comprising foam located between the outer sheets.

27. The structure of claim 23, wherein the core sheet has a total embossed thickness of at least 10 mm as measured between the opposite peaks and valleys.

28. The structure of claim 23, wherein the core sheet has a total embossed thickness of at least 13 mm as measured between the opposite peaks and valleys without fracturing the core sheet, for a core sheet length-to-width ratio of at least 4.

* * * * *